(12) United States Patent
Imamura et al.

(10) Patent No.: US 9,699,363 B2
(45) Date of Patent: Jul. 4, 2017

(54) CAMERA SYSTEM, CAMERA BODY, INTERCHANGEABLE LENS, AND COMMUNICATION METHOD

(71) Applicant: FUJIFILM Corporation, Tokyo (JP)

(72) Inventors: Kenshi Imamura, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/093,934

(22) Filed: Apr. 8, 2016

(65) Prior Publication Data

US 2016/0227084 A1 Aug. 4, 2016

Related U.S. Application Data

(63) Continuation of application No. PCT/JP2014/075861, filed on Sep. 29, 2014.

(30) Foreign Application Priority Data

Nov. 8, 2013 (JP) ................................. 2013-232423

(51) Int. Cl.
*H04N 5/225* (2006.01)
*G03B 17/14* (2006.01)
(Continued)

(52) U.S. Cl.
CPC ........... *H04N 5/2254* (2013.01); *G03B 17/14* (2013.01); *H04N 5/04* (2013.01); *H04N 5/23209* (2013.01);
(Continued)

(58) Field of Classification Search
CPC ..... G03B 17/14; G03B 19/12; H04N 5/23209
See application file for complete search history.

(56) References Cited

U.S. PATENT DOCUMENTS

2011/0043678 A1* 2/2011 Ueda ...................... G03B 13/36
348/345
2011/0064397 A1* 3/2011 Shibuno ................ G03B 17/14
396/133
(Continued)

FOREIGN PATENT DOCUMENTS

JP 2012-58524 A 3/2012
JP 2012-505562 A 3/2012
(Continued)

OTHER PUBLICATIONS

International Preliminary Report on Patentability for PCT/JP2014/075861(PCT/IPEA/409) completed on Nov. 24, 2015.
(Continued)

*Primary Examiner* — Sinh Tran
*Assistant Examiner* — Selam Gebriel
(74) *Attorney, Agent, or Firm* — Birch Stewart Kolasch & Birch, LLP

(57) ABSTRACT

In a camera system including a camera body (200) and an interchangeable lens (100), the camera body includes a body-side communication unit, and a body-side control unit that transmits a request signal to the interchangeable lens via the body-side communication unit, and receives a response signal corresponding to the transmitted request signal from the interchangeable lens via the body-side communication unit, the interchangeable lens includes a lens-side communication unit, and a lens-side control unit that transmits the response signal corresponding to the received request signal to the camera body via the lens-side communication unit when receiving the request signal via the lens-side communication unit, and the lens-side control unit transmits lens information in synchronization with a frame of a video without receiving a request signal for lens information from the camera body at least in a video recording mode.

20 Claims, 13 Drawing Sheets

(51) Int. Cl.
*H04N 5/232* (2006.01)
*H04N 5/77* (2006.01)
*H04N 5/907* (2006.01)
*H04N 9/804* (2006.01)
*H04N 5/04* (2006.01)
*H04N 5/44* (2011.01)

(52) U.S. Cl.
CPC ......... *H04N 5/23245* (2013.01); *H04N 5/772* (2013.01); *H04N 5/907* (2013.01); *H04N 9/8042* (2013.01); *G03B 2206/00* (2013.01); *H04N 5/44* (2013.01)

(56) References Cited

U.S. PATENT DOCUMENTS

| | | |
|---|---|---|
| 2011/0080488 A1 | 4/2011 | Okamoto et al. |
| 2011/0187874 A1 | 8/2011 | Kikuchi |
| 2012/0308220 A1 | 12/2012 | Ohtsuka |
| 2013/0016268 A1 | 1/2013 | Nakata |
| 2013/0044239 A1* | 2/2013 | Makigaki ............... H04N 5/225 348/231.99 |
| 2014/0247384 A1 | 9/2014 | Hokkezu et al. |

FOREIGN PATENT DOCUMENTS

| | | |
|---|---|---|
| JP | 2013-17160 A | 1/2013 |
| JP | 2013-26664 A | 2/2013 |
| JP | 5393930 B2 | 1/2014 |
| WO | WO 2009/139118 A1 | 11/2009 |
| WO | WO 2013/001853 A1 | 1/2013 |

OTHER PUBLICATIONS

International Search Report for PCT/JP2014/075861 (PCT/ISA/210) mailed on Dec. 22, 2014.
Written Opinion of the International Searching Authority for PCT/JP2014/075861 (PCT/ISA/237) mailed on Dec. 22, 2014.

* cited by examiner

CAMERA SYSTEM, CAMERA BODY, INTERCHANGEABLE LENS, AND COMMUNICATION METHOD

CROSS-REFERENCE TO RELATED APPLICATIONS

This application is a Continuation of PCT International Application No. PCT/JP2014/075861 filed on Sep. 29, 2014, which claims priority under 35 U.S.C §119(a) to Japanese Patent Application No. 2013-232423 filed on Nov. 8, 2013. Each of the above application(s) is hereby expressly incorporated by reference, in its entirety, into the present application.

BACKGROUND OF THE INVENTION

1. Field of the Invention

The present invention relates to an interchangeable lens and a camera body and, in particular, to a technology for communication between the interchangeable lens and the camera body.

2. Description of the Related Art

In recent digital cameras, cameras capable of high-quality video imaging of a Full-HD (High Definition) video or the like have been widespread with increasing speed of an imaging element. Similarly, a camera with an interchangeable lens is also capable of high-quality video imaging. In a camera with an interchangeable lens, in order to perform image processing on a video according to lens characteristics, it is preferable for a camera body to acquire a state (for example, focus position, diaphragm information, or zoom information) of the lens for each frame during video imaging.

Further, there is conventionally a communication method in which a camera body sends a request (request signal) to an interchangeable lens periodically regardless of a frame of a video so as to confirm whether there is a change in a lens state, and the interchangeable lens sends a response (response signal) regarding the lens state of an item in which there is a change, to the camera body (request-response scheme).

In WO2009/139118A, communication using a request-response scheme is disclosed. In this request-response scheme, necessary information can be acquired when necessary. Further, the request-response scheme is effective in a case in which a camera body does not require lots of information. Cases in which the camera body does not require lots of information include, for example, a case in which the camera body is set to preferentially perform communication for lens driving and control, a case in which a live view display mode is set, and a case in which a video recording mode is set and a large amount of information is not necessary for image processing of a video.

Further, in JP2012-58524A, a technology regarding communication between a camera body and an interchangeable lens through first and second transmission paths has been proposed. In this technology, the first transmission path is used for unidirectional communication, and the second transmission path is used for bidirectional communication.

However, in a case in which a point image restoration process is performed as image processing, lots of lens information such as an F value (diaphragm information), zoom information, and a focus position is necessary for each frame on which the point image restoration process is performed. In particular, 3 pieces of information including the F value, the zoom information, and the focus position are important.

JP2012-505562A discloses that a point image restoration process is performed on an acquired image. Here, the point image restoration process is a process of canceling out degradation of the image by applying a restoration filter (inverse filter) produced based on a point spread function to captured image data. That is, the point image restoration process is a process of performing image processing based on the point spread function (PSF) on a captured image of which the image quality has deteriorated, to recover the image quality, in which the image deterioration caused by aberration or the like is represented by the point spread function.

SUMMARY OF THE INVENTION

However, in the request-response scheme as disclosed in WO2009/139118A, when the camera body needs lots of information in a short period of time, communication of lens information may not be in time. A case in which the camera body needs lots of information in a short period of time is, for example, a case in which the camera body performs the point image restoration process on a video in a video mode. In general, in the video mode, a frame rate is 24 fps (frame per second), 30 fps, or 60 fps. Further, in a case in which the point image restoration process is performed in the video mode, it is necessary to acquire lots of lens information for each frame. Accordingly, if the lens information is acquired using the request-response scheme in a case in which the point image restoration process is performed in the video mode, a communication frequency increases and acquisition of necessary information may not be in time.

Further, in a case in which communication between the camera body and the interchangeable lens is performed using the first and second transmission paths disclosed in JP2012-58524A, it is necessary for the camera body and the interchangeable lens to have extra terminals for the first and second transmission paths. By providing the extra terminals as above, a probability of communication failure between the camera body and the interchangeable lens increases. Further, production costs for providing the extra terminal increase. Further, in JP2012-58524A, performing the communication in synchronization with a frame is not mentioned, and in the technology described in JP2012-58524A, desired lens information may not be acquired in a case in which image processing is performed on the frame.

Further, in a case in which the point image restoration process is performed on the image as disclosed in JP2012-505562A, the lens information is required for each frame. If the lens information is communicated between the interchangeable lens and the camera body using the request-response scheme in each frame, the communication between the interchangeable lens and the camera body is not in time due to limitation on an amount of communication of mount communication and a communication speed, and the camera body may not perform the point image restoration process using appropriate information.

The present invention has been made in view of such circumstances, and an object thereof is to provide a camera system, a camera body, an interchangeable lens, and a communication method capable of transmitting more information in a short period of time and transmitting information necessary for image processing of a frame of a video at an appropriate timing.

A camera system according to an aspect of the present invention is a camera system including a camera body and an interchangeable lens freely detachable and attachable from the camera body, and the camera body includes a body-side communication unit that performs communication with the interchangeable lens; and a body-side control unit that transmits a request signal to the interchangeable lens via the body-side communication unit, and receives a response signal corresponding to the transmitted request signal from the interchangeable lens via the body-side communication unit, the interchangeable lens includes a lens-side communication unit that performs communication with the camera body; and a lens-side control unit that transmits the response signal corresponding to the received request signal to the camera body via the lens-side communication unit when receiving the request signal via the lens-side communication unit, and the body-side control unit transmits a request signal including lens driving to the interchangeable lens via the body-side communication unit at least in the video recording mode, and the lens-side control unit, at least in a video recording mode, transmits the response signal corresponding to the received request signal to the camera body when receiving the request signal including lens driving from the camera body via the lens-side communication unit, and transmits lens information to the camera body in synchronization with a frame of a video without receiving a request signal for lens information from the camera body, and therefore, the transmission of the lens information synchronized with a frame and the transmission and reception of the request signal and the response signal are both performed in a communication period corresponding to one frame.

According to this aspect, the interchangeable lens transmits the lens information to the camera body via the lens-side communication unit as a response signal without a request signal for the lens information at least in the video recording mode. Accordingly, in this aspect, it is possible to transmit lots of information in a short period of time as compared with a case in which a request signal sent from the camera body is waited for and a response signal is transmitted.

Further, according to this aspect, the interchangeable lens transmits the lens information in synchronization with the frame of the video at least in the video recording mode. Accordingly, in this aspect, it is possible to transmit information necessary for image processing of the frame of the video at an appropriate timing.

According to this aspect, the interchangeable lens receives the request signal from the camera body and transmits the response signal corresponding to the request signal at least in the video recording mode. Accordingly, in this aspect, a frame in which the transmission of the lens information synchronized with a frame without reception of a request signal and the transmission of a response signal corresponding to a request signal are both performed in a communication period of one frame is included. Accordingly, in this aspect, it is possible to transmit and receive the lens information or the like rapidly and in a large amount in a period of one frame, and to transmit and receive lens driving information or the like when necessary.

Preferably, the lens-side control unit changes a transmission frequency and transmits the lens information.

According to this aspect, it is possible to transmit important lens information at a higher frequency. Accordingly, in this aspect, it is possible to transmit the lens information more efficiently.

Preferably, the body-side control unit includes a communication mode switching unit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to one frame, and the communication mode switching unit performs switching to the second communication mode in a case in which necessary lens information cannot be acquired in a period of one frame in the first communication mode.

According to this aspect, the camera body includes the communication mode switching unit, and the first communication mode in which only transmission and reception of the request signal and the response signal are performed and the second communication mode in which the lens information is transmitted from the interchangeable lens in synchronization with a frame of a video for each frame are switched between by the communication mode switching unit according to whether the camera body can acquire necessary lens information in a period of one frame, and the communication is performed. Accordingly, in this aspect, it is possible to perform appropriate communication according to the necessary lens information in the period of one frame.

Preferably, the body-side control unit includes a communication mode switching unit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to one frame, and an image processing mode switching unit that switches between a first image processing mode in which the number of pieces of lens information per unit time necessary for image processing of the frame of the video is smaller than a threshold value and a second image processing mode in which the number of pieces of lens information per unit time necessary for image processing of the frame of the video is equal to or greater than the threshold value, and the communication mode switching unit performs switching to the second communication mode in the case of the second image processing mode.

According to this aspect, the camera body includes the communication mode switching unit, and the first communication mode in which only transmission and reception of the request signal and the response signal are performed and the second communication mode in which the lens information is transmitted from the interchangeable lens in synchronization with a frame of a video for each frame are switched between by the communication mode switching unit according to whether the camera body can acquire necessary lens information in a period of one frame, and the communication is performed. Further, according to this aspect, the camera body includes the image processing mode switching unit, the first image processing mode in which the number of pieces of lens information per unit time necessary for image processing of the frame of the video is smaller than the threshold value and the second image processing mode in which the number of pieces of lens information per unit time necessary for image processing of the frame is equal to or greater than the threshold value are switched between by the image processing mode switching unit, and image processing is performed on the video. Accordingly, in this aspect, it is possible to perform communication between the interchangeable lens and the camera body suitable for an amount of lens information necessary for the image processing mode.

Preferably, the first image processing mode is a live view mode in which live view imaging and displaying are performed, and the second image processing mode is the video recording mode.

According to this aspect, the image processing mode switching unit switches between the first image processing mode and the second image processing mode according to the live view mode or the video recording mode. Accordingly, in this aspect, it is possible to appropriately perform the communication of the lens information in the live view mode and the video recording mode.

Preferably, the first image processing mode is the video recording mode in which a point image restoration process is not performed, and the second image processing mode is the video recording mode in which the point image restoration process is performed.

According to this aspect, the image processing mode switching unit switches between the video recording mode in which the point image restoration process is not performed and the video recording mode in which the point image restoration process is performed. Accordingly, in this aspect, it is possible to appropriately perform the communication of the lens information in the video recording mode in which the point image restoration process is not performed and the video recording mode in which the point image restoration process is performed.

Preferably, the lens-side control unit transmits the lens information in synchronization with the frame of the video based on a synchronization signal of an imaging element installed in the camera body or the interchangeable lens.

According to this aspect, the lens-side control unit transmits the lens information in synchronization with the frame of the video using the synchronization signal of the imaging element. Accordingly, in this aspect, it is possible to perform transmission synchronized with the frame of the video more accurately.

Preferably, the lens information of the interchangeable lens includes a plurality of types of lens information, and the lens-side control unit collects a plurality of types of lens information into one piece of information and transmits the information to the camera body.

According to this aspect, the lens-side control unit collects a plurality of types of lens information into one piece of information and transmits the information to the camera body. Accordingly, in this aspect, it is possible to transmit lots of information in a shorter period of time.

Preferably, the lens information of the interchangeable lens includes a plurality of types of lens information, the lens-side control unit changes a type of lens information and transmits the plurality of types of lens information, and the camera body includes an interpolation unit that interpolates a type of lens information insufficient for image processing of the video within the frame using lens information of another frame.

According to this aspect, the lens-side control unit changes the type of lens information for each frame and transmits the resultant lens information. Further, according to this aspect, the interpolation unit interpolates a type of lens information insufficient for image processing of the video using the lens information included in another frame. Accordingly, in this aspect, even in a case in which there is lots of lens information necessary for image processing of the video, it is possible to perform communication so that the image processing can be performed using appropriate lens information for each frame.

Preferably, the lens information of the interchangeable lens includes a plurality of types of lens information, the lens-side control unit assigns a priority to each of the plurality of types of lens information, assigns a transmission frequency based on the priority, and transmits each of the plurality of types of lens information based on the transmission frequency, and the camera body includes an interpolation unit that interpolates a type of lens information insufficient for image processing of the video within the frame using lens information of another frame.

According to this aspect, the lens-side control unit assigns the priority and the transmission frequency according to the priority to each of the plurality of types of lens information, and transmits the lens information based on the transmission frequency. Further, according to this aspect, the interpolation unit interpolates the lens information insufficient for image processing using lens information of another frame. Accordingly, in this aspect, even in a case in which there is lots of lens information necessary for image processing of the video, information important in performing the image processing can be transmitted preferentially.

Preferably, the camera body includes an interpolation unit that interpolates lens information regarding a frame for which the lens information is not transmitted, using lens information of another frame.

According to this aspect, with respect to the frame for which the lens information has not been transmitted, the lens information that has not been transmitted is interpolated using lens information of another frame. Accordingly, in this aspect, it is possible to appropriately perform a process on the frame for which the lens information has not been transmitted. The frame for which the lens information has not been transmitted refers to a frame for which the lens information has not been transmitted despite the necessity of the lens information in processing the frame. Here, the process refers to, for example, image processing of the frame.

Preferably, the lens information of the interchangeable lens includes lens information of diaphragm information, zoom information, and a focus position, the body-side control unit transmits a request signal regarding a notification indicating that a point image restoration process is set and a notification indicating that the video recording mode has started to the interchangeable lens, and the lens-side control unit receives the request signal, and transmits the lens information in each frame in an order of the diaphragm information, the zoom information, and the focus position.

According to this aspect, in a case in which the lens information includes lens information of the diaphragm information, the zoom information, and the focus position, the lens-side control unit transmits the diaphragm information, the zoom information, and the focus position to the camera body in this order. Accordingly, in this aspect, even in a case in which there are three types of lens information, it is possible to appropriately perform communication.

Here, the diaphragm information is information indicating a diaphragm value (F value) or a diaphragm aperture diameter, the zoom information is information indicating a position, a focal length, or a zoom magnification of the zoom lens, and the focus position is information on the position of the lens in a focusing state.

Preferably, the camera body includes an image correction unit that performs image correction on video data generated inside the camera body, and the image correction unit performs the image correction on the video data using the lens information.

According to this aspect, the camera body includes the image correction unit. Accordingly, in this aspect, it is possible to perform communication for appropriately transmitting the lens information to be used for image correction performed by the image correction unit.

Preferably, the image correction performed by the image correction unit is a point image restoration process.

According to this aspect, the image correction unit performs the point image restoration process. Accordingly, in this aspect, it is possible to perform the communication for appropriately transmitting the lens information necessary for the point image restoration process for the video.

A camera body according to another aspect of the present invention is a camera body that communicates with an interchangeable lens, the camera body comprises a body-side communication unit that performs communication with the interchangeable lens; and a body-side control unit that transmits a request signal to the interchangeable lens via the body-side communication unit, and receives a response signal corresponding to the transmitted request signal from the interchangeable lens, and the body-side control unit receives lens information in synchronization with a frame of a video without the interchangeable lens receiving a request signal for lens information from the camera body at least in a video recording mode.

An interchangeable lens according to yet another aspect of the present invention is an interchangeable lens that communicates with a camera body, the interchangeable lens includes a lens-side communication unit that performs communication with the camera body; and a lens-side control unit that transmits a response signal corresponding to a received request signal to the camera body when receiving the request signal via the lens-side communication unit, and the lens-side control unit transmits lens information in synchronization with a frame of a video without receiving a request signal for lens information from the camera body at least in a video recording mode.

A communication method according to yet another aspect of the present invention is a communication method in which a camera body transmits a request signal to an interchangeable lens, and the interchangeable lens transmits a response signal corresponding to the transmitted request signal to the camera body, and the interchangeable lens transmits lens information in synchronization with a frame of a video without receiving a request signal for the lens information from the camera body at least in a video recording mode.

According to the present invention, since the interchangeable lens transmits the lens information in synchronization with the frame of the video without receiving the request signal from the camera body, it is possible to transmit more information in a short period of time and transmit the information necessary for image processing of the video at an appropriate timing.

DESCRIPTION OF THE PREFERRED EMBODIMENTS

Hereinafter, embodiments of the present invention will be described in detail with reference to the accompanying drawings.

Figure 1:
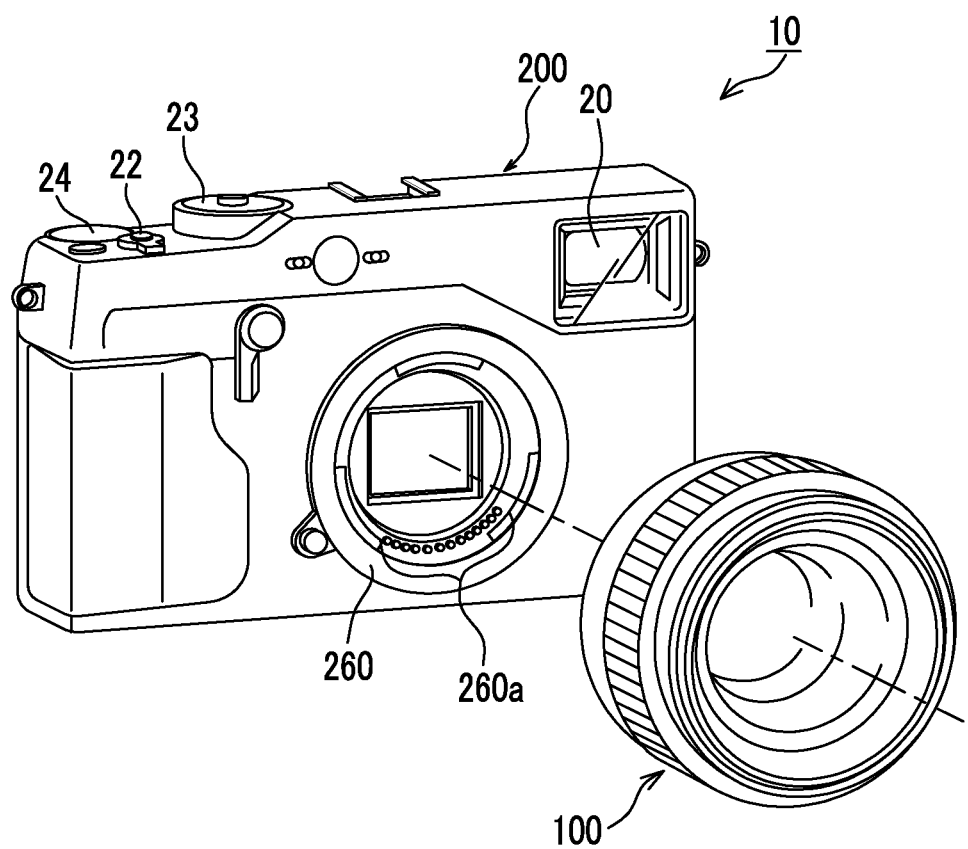
FIG. 1 is a perspective view illustrating an appearance of an imaging device.

FIG. 1 is a perspective view illustrating an oblique front appearance of a camera system (imaging device 10) of an embodiment of the present invention.

As illustrated in FIG. 1, the imaging device 10 includes an interchangeable lens 100, and a camera body 200. The interchangeable lens 100 includes a lens mount 160 (FIG. 3) freely attached to or detached from a body mount 260 included in the camera body 200. The interchangeable lens 100 of this example has a cylindrical shape, and the lens mount 160 is formed at an end portion of this interchangeable lens 100. The camera body 200 includes the body mount 260 freely to mount or demount the lens mount 160 of the interchangeable lens 100. The camera body 200 of this example has a box shape, and the body mount 260 is formed approximately at a center in front of the camera body 200. By mounting the lens mount 160 of the interchangeable lens 100 on the body mount 260 of the camera body 200, the interchangeable lens 100 is detachably attached to the camera body 200.

A plurality of terminals are provided as contacts in the lens mount 160 and the body mount 260, respectively. FIG. 1 illustrates a plurality of terminals 260a (body-side terminals) of the body mount 260. In the case that the lens mount 160 is mounted on the body mount 260, the terminals of the lens mount 160 and the body mount 260 are abutted and conducted (see FIGS. 3 and 4). In this example, along a circumferential direction of the interchangeable lens 100, the plurality of terminals 260a are provided in the body mount 260, and the plurality of terminals (see FIG. 4) are provided in the lens mount 160.

An optical finder window 20 is mainly provided in the front of the camera body 200. On a top surface of the camera body 200, a shutter release button 22, a shutter speed dial 23, and an exposure correction dial 24 are mainly provided.

The shutter release button 22 is operation means for inputting an instruction to start imaging, and is configured as a switch of a 2-step stroke type including so-called "half press" and "full press". In the imaging device 10, when the shutter release button 22 is half-pressed, an S1 ON signal is output, and when the shutter release button 22 is further pressed from the half press to be full-pressed, an S2 ON signal is output. In the case that the S1 ON signal is output, an imaging preparation process such as auto focusing (AF process) or automatic exposure control (AE process) is executed, and in the case that the S2 ON signal is output, an imaging process is executed. Further, in the case of a video imaging mode, when the shutter release button 22 is full-pressed, a video recording mode starts.

The shutter release button 22 is not limited to the form of the switch of a 2-step stroke type including half press and full press, but may output the S1 ON signal and the S2 ON signal through onetime operation, or individual switches may be provided to output the S1 ON signal and the S2 ON signal. Further, in a form in which an operation instruction is performed by a touch panel or a like, operating means may output the operation instruction by touching an area corresponding to the operation instruction displayed on a screen of the touch panel. In the present invention, a form of the operating means is not limited thereto as long as the operating means instructs the imaging preparation process or the imaging process. Further, the imaging preparation process and the imaging process may be continuously executed through an operation instruction in one operating means.

A user performs adjustment of a shutter speed using the shutter speed dial 23 and performs correction of exposure using the exposure correction dial 24.

Figure 2:
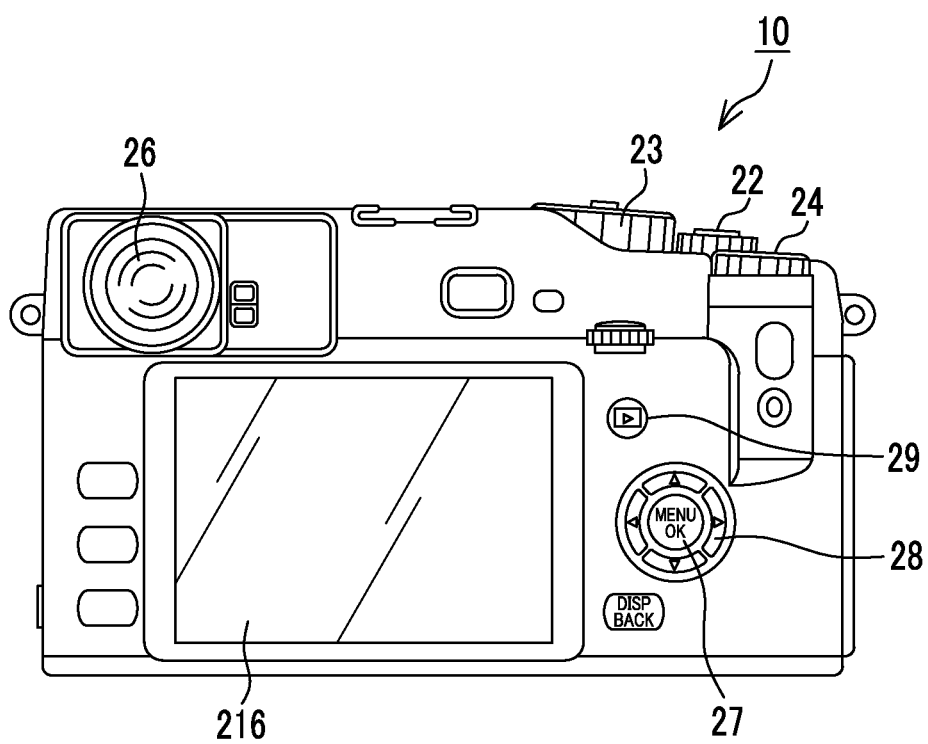
FIG. 2 is a rear view illustrating a rear surface of the imaging device.

FIG. 2 is a rear view of the imaging device 10. An liquid crystal monitor 216, an eyepiece portion 26 of an optical viewfinder, an MENU/OK key 27, a cross key 28, a playback button 29, and the like are mainly provided in the rear of the camera body 200, as illustrated in FIG. 2.

The liquid crystal monitor 216 displays a live view image, displays a captured image if the playback button 29 is pressed, or displays a captured video. The user can perform various settings of the imaging device 10 using the MENU/OK key 27 and the cross key 28. For example, the user can perform switching between a still image capturing mode and a video imaging mode or setting regarding whether or not specific image processing (point image restoration process) is executed, using the MENU/OK key 27 and the cross key 28.

Figure 3:
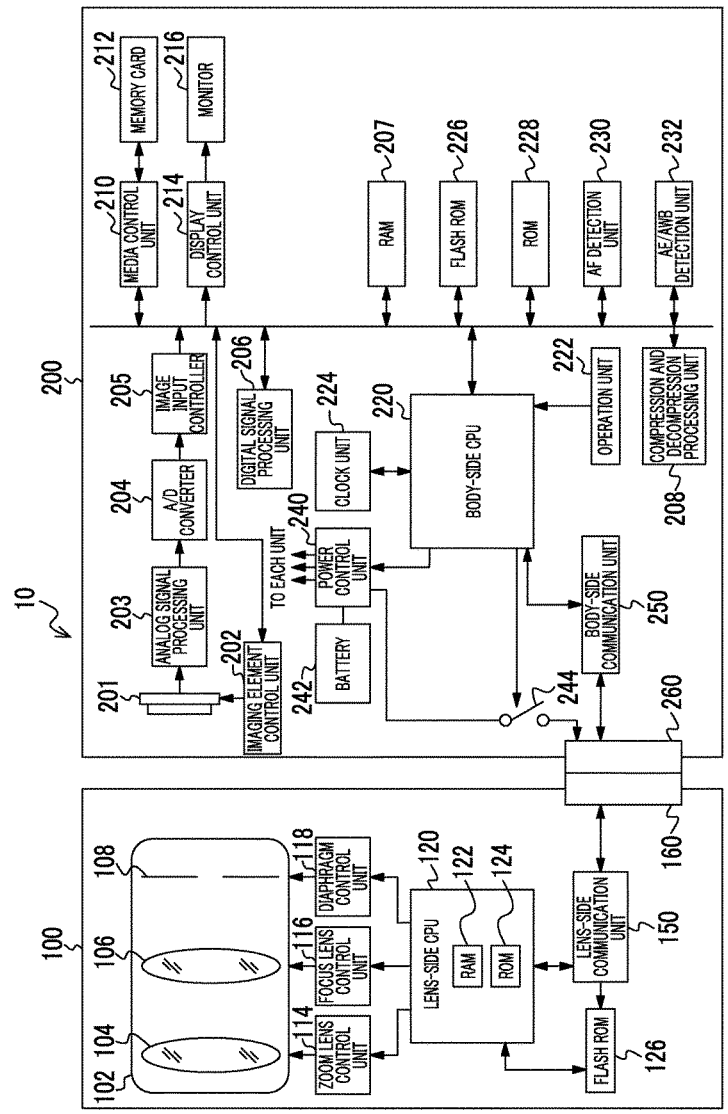
FIG. 3 is a block diagram illustrating a configuration of the imaging device.

FIG. 3 is a block diagram illustrating an entire configuration of the imaging device 10.

The interchangeable lens 100 includes an imaging optical system 102 (a zoom lens 104, a focus lens 106, and a diaphragm 108), a zoom lens control unit 114, a focus lens control unit 116, a diaphragm control unit 118, a lens-side CPU 120 (lens-side control unit), a flash read only memory (ROM) 126, a lens-side communication unit 150, and the lens mount 160 (lens-side mounting unit).

The imaging optical system 102 includes the zoom lens 104, the focus lens 106, and the diaphragm 108. The zoom lens control unit 114 controls a position of the zoom lens 104 according to a command from the lens-side CPU 120. The focus lens control unit 116 controls a position of the focus lens 106 according to a command from the lens-side CPU 120. The diaphragm control unit 118 controls an aperture area of the diaphragm 108 according to a command from the lens-side CPU 120.

The lens-side CPU 120 is a central processing unit (CPU) of the interchangeable lens 100, and includes a ROM 124 and a random access memory (RAM) 122 built therein.

The flash ROM 126 is a nonvolatile memory that stores, for example, a program downloaded like from the camera body 200.

The lens-side CPU 120 controls each unit of the interchangeable lens 100 using the RAM 122 as a work area according to a control program stored in the ROM 124 or the flash ROM 126.

The lens-side communication unit 150 performs communication with the camera body 200 via a plurality of signal terminals provided in the lens mount 160 in a state in which the lens mount 160 is mounted on the body mount 260 of the camera body 200.

The camera body 200 includes an imaging element (CMOS type or CCD type) 201, an imaging element control unit 202, an analog signal processing unit 203, an A/D converter 204, an image input controller 205, a digital signal processing unit 206, a RAM 207, a compression and decompression processing unit 208, a media control unit 210, a memory card 212, a display control unit 214, a monitor 216, a body-side CPU (body-side control unit) 220, an operation unit 222, a clock unit 224, a flash ROM 226, a ROM 228, an AF detection unit 230, an AE/AWB detection unit 232, a power control unit 240, a battery 242, a body-side communication unit 250, and a body mount 260. While the imaging element 201 is installed in the camera body 200 in FIG. 3, the present invention is not limited thereto. The imaging element 201 may be installed, for example, inside the interchangeable lens 100.

The imaging element 201 includes an image sensor that images a subject. An optical image of the subject formed on a light reception surface of the imaging element 201 by the imaging optical system 102 of the interchangeable lens 100 is converted into an electric signal by the imaging element 201. Examples of the imaging element 201 include a complementary metal oxide semiconductor (CMOS) type image sensor, and a charge coupled device (CCD) type image sensor.

The imaging element control unit 202 controls imaging timing, exposure time, or the like of the imaging element 201 according to a command of the body-side CPU 220.

The analog signal processing unit 203 performs various analog signal processing on an analog image signal obtained by the imaging element 201 imaging the subject. The analog signal processing unit 203 of this example includes, for example, a sample and hold circuit, a color separation circuit, and a gain adjustment circuit.

The A/D converter 204 converts an analog image signal output from the analog signal processing unit 203 into a digital image signal.

Figure 10:
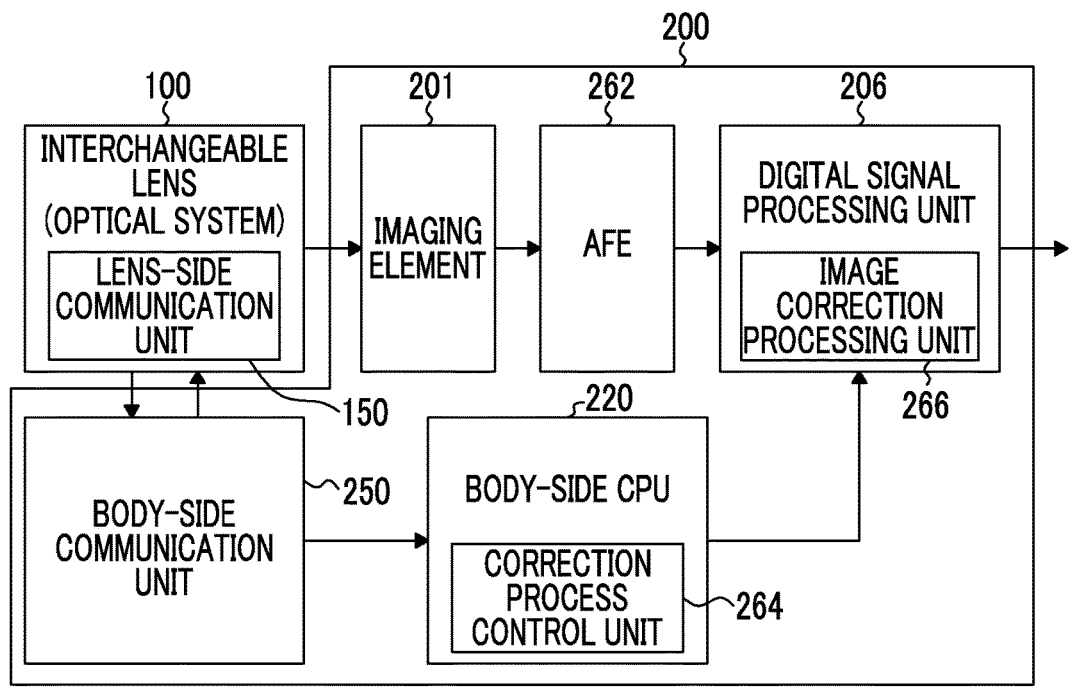
FIG. 10 is a main block diagram of an imaging device in application example 1.

The image input controller 205 temporarily stores the digital image signal output from the A/D converter 204 in the RAM 207 as image data. In a case in which the imaging element 201 is a CMOS-type imaging element, the A/D converter 204 is often built in the imaging element 201. An analog signal processing unit 203, the A/D converter 204, and the image input controller 205 described above constitute an analog front end (AFE) 262 (FIG. 10).

The digital signal processing unit 206 performs various digital signal processing on the image data stored in the RAM 207. The digital signal processing unit 206 in this example includes, for example, a luminance and chrominance signal generation circuit, a gamma correction circuit, a sharpness correction circuit, a contrast correction circuit, a white balance correction circuit, and a point image restoration process circuit.

The compression and decompression processing unit 208 performs a compression process on uncompressed image data stored in the RAM 207. Further, the compression and decompression processing unit 208 performs a decompression process on the compressed image data.

The media control unit 210 performs control to store the image data compressed by the compression and decompression processing unit 208 in the memory card 212. Further, the media control unit 210 performs control to read the compressed image data from the memory card 212.

The display control unit 214 performs control to display the uncompressed image data stored in the RAM 207 on the monitor 216. For the monitor 216, a liquid crystal monitor or an organic EL monitor may be adopted.

In a case in which a live view image is displayed on the monitor 216, digital image signals continuously generated by the digital signal processing unit 206 are temporarily stored in the RAM 207. The display control unit 214 converts the digital image signals temporarily stored in this RAM 207 to displaying signal format, and sequentially outputs the resultant signals to the monitor 216. Accordingly, the captured images are displayed on the monitor 216 in real time, such that imaging can be performed using the monitor 216 as an electronic viewfinder.

In a case in which imaging of the subject and recording of the image of the subject are performed, AE control and AF control are performed under the control of the body-side CPU 220 by half press of the shutter release button 22, and imaging is performed by full press. An image acquired by imaging is compressed in a predetermined compression format (for example, a JPEG format in the case of a still image or H264 in the case of a video) by the compression and decompression processing unit 208. The compressed image data is converted into an image file to which necessary ancillary information such as imaging date and time or imaging conditions is added, and then, the image file is stored in the memory card 212 via the media control unit 210.

The body-side CPU 220 collectively controls an entire operation of the imaging device 10. Further, the body-side CPU 220 constitutes a mounting determination unit that determines whether or not the interchangeable lens 100 has been mounted on the body mount 260.

The operation unit 222 includes the shutter release button 22, the shutter speed dial 23, the exposure correction dial 24, the MENU/OK key 27, the cross key 28, and the playback button 29 illustrated in FIG. 1. The body-side CPU 220 controls each unit of the imaging device 10 based on an input from the operation unit 222 or the like.

The clock unit 224 is a timer and measures time based on a command from the body-side CPU 220. Further, the clock unit 224 is a calendar and measures current date and time.

The flash ROM 226 is a readable and writable non-volatile memory, and stores setting information.

Various data necessary for a control program or control executed by the body-side CPU 220 is recorded in the ROM 228. The body-side CPU 220 controls each unit of the imaging device 10 according to the control program stored in the ROM 228 using the RAM 207 as a working area.

The AF detection unit 230 calculates a numerical value necessary for autofocus (AF) control based on the digital image signal. In the case of so-called contrast AF, for example, an integration value (focus evaluation value) of a high frequency component of a signal of a G (green) pixel in a predetermined AF area is calculated. The body-side CPU 220 moves the focus lens 106 to a position in which the focus evaluation value is maximized. AF is not limited to the contrast AF. For example, phase difference AF may be performed.

The AE/AWB detection unit 232 calculates a numerical value necessary for AE (automatic exposure) control and AWB (automatic white balance) control based on the digital image signal. The body-side CPU 220 calculates brightness of the subject (subject luminance) based on the numerical value obtained from the AE/AWB detection unit 232, and determines the diaphragm information (F value) and the shutter speed from a predetermined program diagram.

The power control unit 240 applies a power supply voltage supplied from the battery 242 to each unit of the camera body 200 according to a command of the body-side CPU 220. Further, the power control unit 240 applies the power supply voltage supplied from the battery 242 to each unit of the interchangeable lens 100 via the body mount 260 and the lens mount 160 according to a command of the body-side CPU 220.

The lens power switch 244 performs switching between ON and OFF and switching between levels of the supply voltage applied to the interchangeable lens 100 via the body mount 260 and the lens mount 160 according to a command of the body-side CPU 220.

The body-side communication unit 250 performs signal transmission to and reception (communication) from the lens-side communication unit 150 of the interchangeable lens 100 which is connected via the body mount 260 and the lens mount 160 according to a command of the body-side CPU 220. Meanwhile, the lens-side communication unit 150 performs signal transmission to and reception (communication) from the body-side communication unit 250 of the camera body 200 which is connected via the lens mount 160 and the body mount 260 according to a command of the lens-side CPU 120.

Figure 4:
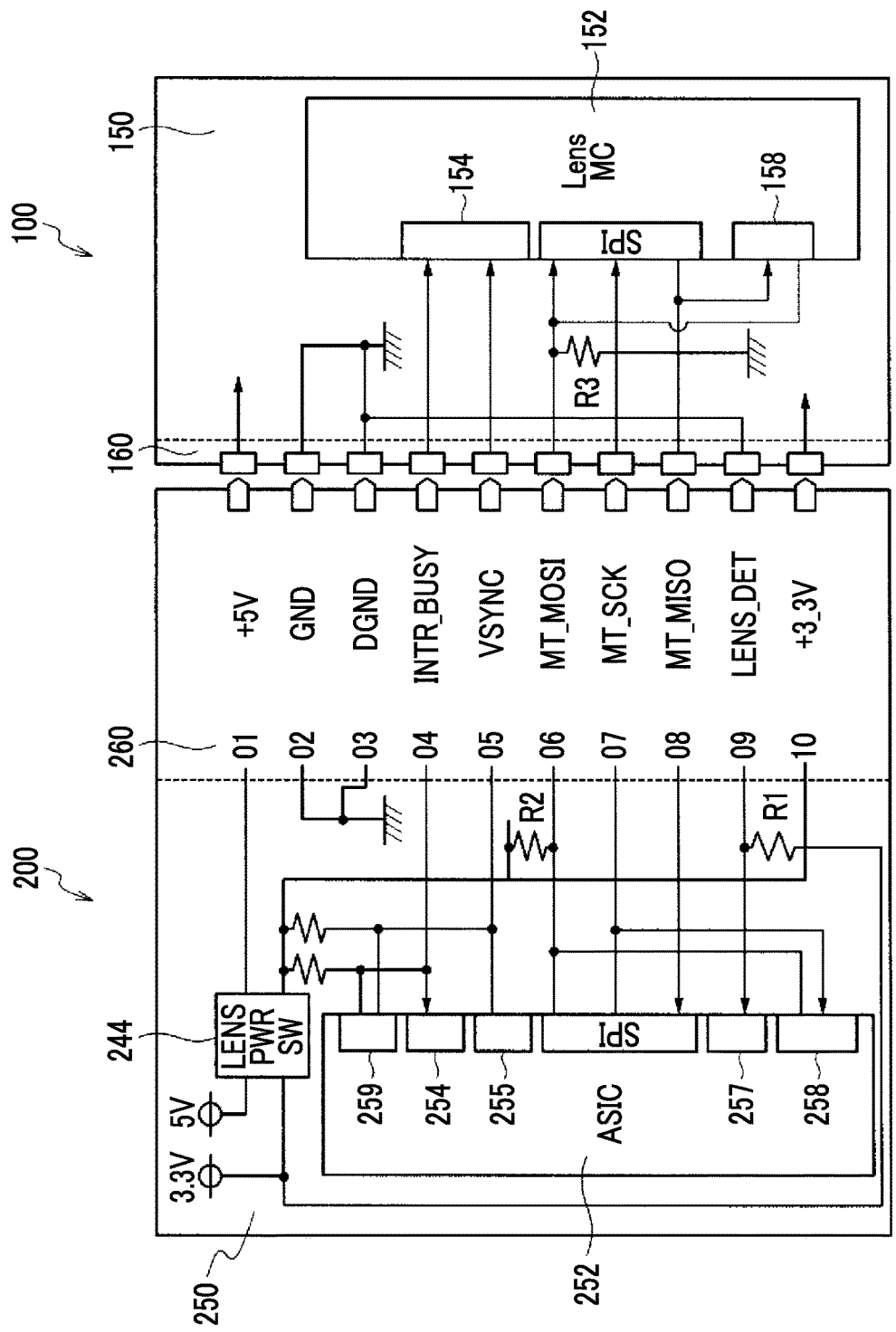
FIG. 4 is an illustrative diagram illustrating peripheral portions of mounts.

FIG. 4 is an illustrative diagram illustrating the body mount 260, the lens mount 160, and peripheral portions thereof. In a state in which the lens mount 160 is mounted on the body mount 260, the plurality of terminals 260a (10 terminals with numbers "01" to "10" of FIG. 4 in this example) of the body mount 260 are abutted on the plurality of terminals of the lens mount 160, respectively.

A first terminal (+5 V terminal) of the body mount 260 is a first body-side power supply terminal for applying a +5 V voltage of the battery 242 from the camera body 200 to the interchangeable lens 100. The first terminal (+5 V terminal) of the body mount 260 is connected to the power control unit 240 and the battery 242 via the lens power switch 244.

A second terminal (GND terminal) and a third terminal (DGND terminal) of the body mount 260 are body-side ground terminals for applying a 0 V (ground voltage) from the camera body 200 to the interchangeable lens 100. The second terminal and the third terminal are connected to a ground of the camera body 200.

Fourth to eighth terminals of the body mount 260 are a plurality of body-side signal terminals for signal transmission to and reception from the interchangeable lens 100.

The fourth terminal (INTR_BUSY signal terminal) of the body mount 260 is a body-side busy signal terminal for notification of whether or not a period is a period of a specific operation of the interchangeable lens 100 or the camera body 200.

The fifth terminal (VSYNC signal terminal) of the body mount 260 is a body-side signal terminal for synchronization between the camera body 200 and the interchangeable lens 100.

The sixth terminal (MT_MOST signal terminal), the seventh terminal (MT_SCK signal terminal), and the eighth terminal (MT_SIMO signal terminal) of the body mount 260 are body-side communication signal terminals for serial communication between the camera body 200 and the interchangeable lens 100. An MT_MOSI signal is a signal that is output from the camera body 200 as a master and input to the interchangeable lens 100 as a slave. An MT_SCK signal is a clock signal applied from the camera body 200 as a master to the interchangeable lens 100 as a slave. An MT_SIMO signal is a signal output from the interchangeable lens 100 as a slave and input to the camera body 200 as a master.

A ninth terminal (LENS_DET terminal) of the body mount 260 is a body-side terminal for only detection of the interchangeable lens 100. In this example, a high level (high potential) indicates that the LENS_DET terminal of the body mount 260 and a LENS_DET terminal of the lens mount 160 are in a non-abutting state (non-mounting state), and a low level (low potential) indicates that the LENS_DET terminal of the body mount 260 and the LENS_DET terminal of the lens mount 160 are in an abutting state (mounting state).

A tenth terminal (+3.3 V terminal) of the body mount 260 is a second body-side power supply terminal for applying a +3.3 V voltage of the battery 242 from the camera body 200 to the interchangeable lens 100.

A ninth terminal (LENS_DET terminal) of the body mount 260 is connected to the power control unit 240 and the battery 242 via a pull-up resistor R1. Further, the sixth terminal (MT_MOSI signal terminal) among the plurality of signal terminals (fourth to eighth terminals) for signal transmission and reception (communication) of the body mount 260 is connected to the battery 242 via a pull-up resistor R2 and the lens power switch 244.

The second pull-up resistor R2 is connected to the lens power switch 244, and the sixth terminal (MT_MOST signal terminal) is not pulled up in a state in which the lens power switch 244 is turned off (a state in which the interchangeable lens 100 is not powered on). In a state in which the lens power switch 244 is turned on by the body-side CPU 220 (a state in which the interchangeable lens 100 is powered on), the sixth terminal (MT_MOSI signal terminal) is pulled up. That is, when only the power switch of the camera body 200 is turned on, the voltage of the sixth terminal (MT_MOSI signal terminal) of the interchangeable lens 100 does not become a high level, whereas only when the lens power switch 244 is turned on by the body-side CPU 220, the voltage of the sixth terminal (MT_MOSI signal terminal) of the interchangeable lens 100 becomes a high level. Accordingly, malfunction of Lens MC 152 (Integrated Circuit) on the interchangeable lens 100 side is prevented.

The body-side CPU 220 (mounting determination unit) of the camera body 200, before pre-power is supplied to the interchangeable lens 100 via the body-side power supply terminal of the body mount 260, determines whether or not the ninth terminal (LENS_DET terminal) as the only determination target is at a low level. In a case in which the LENS_DET terminal is determined at a low level by the determination, the body-side CPU 220, after the pre-power is supplied to the interchangeable lens 100 via the body-side power supply terminal of the body mount 260, determines whether or not both of the LENS_DET terminal and the sixth terminal (MT_MOSI signal terminal) at the time of non-communication are at a low level.

The ninth terminal (LENS_DET terminal) of the lens mount 160 is connected to ground (GND terminal and DGND terminal). Further, the sixth terminal (MT_MOST signal terminal) among the plurality of signal terminals (fourth to eighth terminals) of the lens mount 160 is connected to the ground via a pull-down resistor R3, which has a sufficiently smaller resistance value than the pull-up resistor R2.

The body-side CPU 220 as a mounting determination unit determines whether or not the lens mount 160 is mounted on the body mount 260 (that is, determines whether or not the interchangeable lens 100 is mounted on the camera body 200) based on the voltage (high/low level) of the ninth terminal (LENS_DET terminal) of the body mount 260 and the voltage (high/low level) of the specific body-side signal terminal (MT_MOST signal terminal in this example) at the time of non-communication. Specifically, the body-side CPU 220 determines that the interchangeable lens 100 is mounted on the body mount 260 when both the voltage of the LENS_DET terminal and the voltage of the MT_MOSI signal terminal at the time of non-communication of the camera body 200 become at a low level.

Further, the lens-side CPU 120 may determine whether or not the lens mount 160 is mounted on the body mount 260 (that is, determine whether or not the interchangeable lens 100 is mounted on the camera body 200) based on the voltage of the ninth terminal (LENS_DET terminal) of the lens mount 160 and the voltage of the specific lens-side signal terminal (MT_MOST signal terminal in this example) at the time of non-communication. Specifically, the lens-side CPU 120 determines that the interchangeable lens 100 is mounted on the body mount 260 when both the voltage of the LENS_DET terminal and the voltage of the MT_MOSI signal terminal at the time of non-communication of the interchangeable lens 100 become at a low level.

An ASIC 252 (integrated circuit) constituting the body-side communication unit 250 includes a terminal 254 for detecting a change (high/low) in a potential of the fourth terminal (INTR_BUSY signal terminal) of the body mount 260, a terminal 255 for applying a synchronization signal to the fifth terminal (VSYNC signal terminal) of the body mount 260, an interface SPI for serial communication using the sixth to eighth terminals (hereinafter also referred to as "communication signal terminals") of the body mount 260, a terminal 257 for detecting a change (high/low) in a potential of the ninth terminal (LENS_DET terminal) of the body mount 260, and terminals 258 and 259 for updating firmware of the interchangeable lens 100.

A Lens MC 152 (integrated circuit) constituting the lens-side communication unit 150 includes a terminal 154 for detecting a change (high/low) in a potential of the fourth terminal (INTR_BUSY signal terminal) of the lens mount 160, an interface SPI for serial communication using the sixth to eighth terminals (communication signal terminals) on the lens side of the lens mount 160, and a terminal 158 for updating the firmware of the interchangeable lens 100.

[Communication Method]

Next, a communication method of the present invention will be described.

Figure 5:
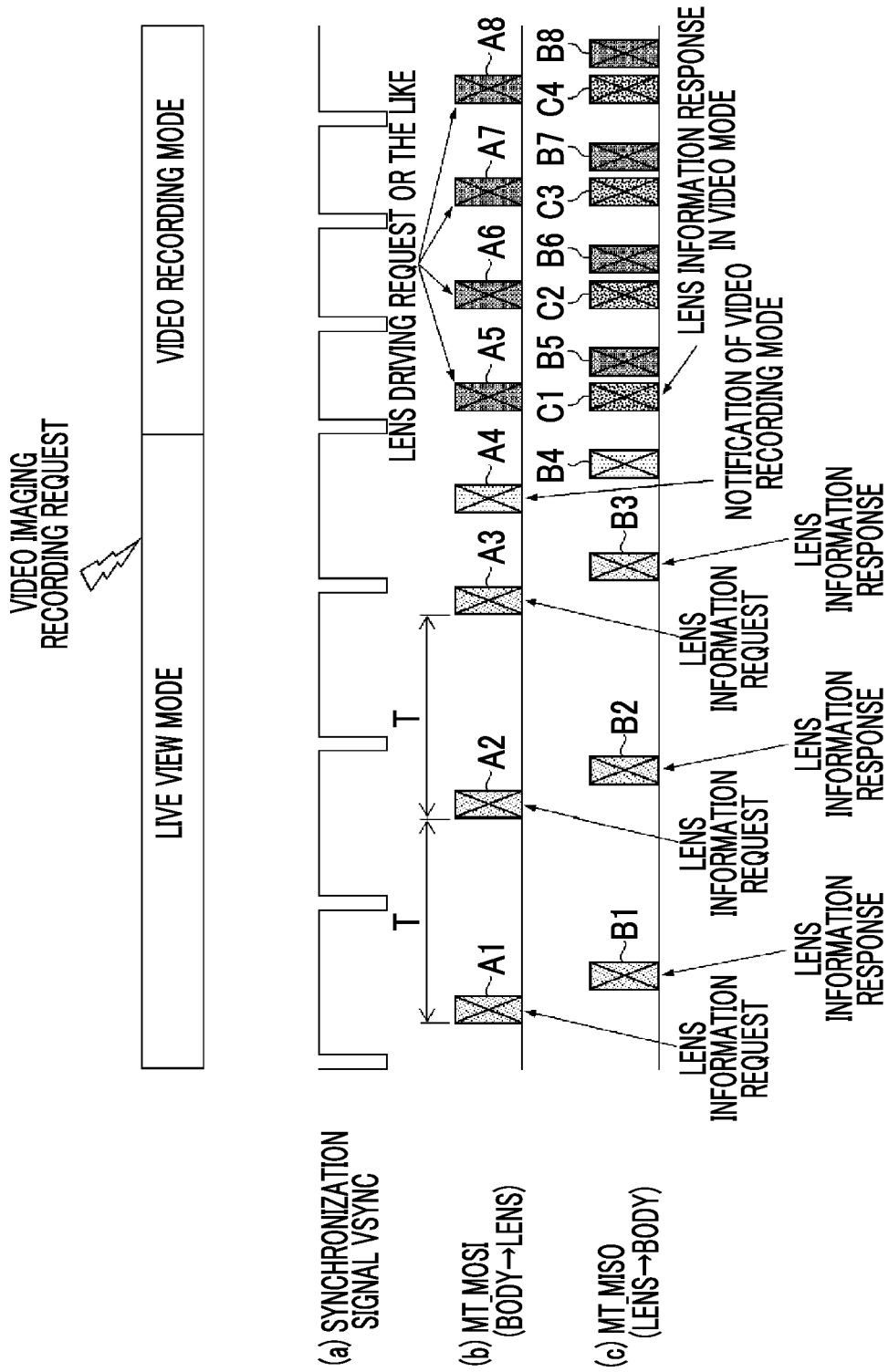
FIG. 5 is a timing chart illustrating communication between an interchangeable lens and a camera body.

FIG. 5 is a timing chart illustrating a communication method in a normal communication mode (first communication mode) and a communication method in a synchronous signal synchronization communication mode (hereinafter referred to as "synchronous communication mode" (second communication mode)). Further, communication from the camera body 200 to the interchangeable lens 100 is performed by the sixth terminal (MT_MOSI signal terminal) of the body mount 260, and communication from the interchangeable lens 100 to the camera body 200 is performed by the eighth terminal (MT_SIMO signal terminal) of the body mount 260.

The normal communication mode is a communication mode used in the live view mode in this embodiment, as illustrated in FIG. 5. In the normal communication mode, when the camera body 200 acquires, for example, lens information, request signals A1, A2, and A3 requesting acquisition of the lens information are transmitted from the camera body 200 to the interchangeable lens 100 at a constant period T as illustrated in (b) in FIG. 5, irrespective of a synchronization signal VSYNC ((a) in FIG. 5) of the imaging element 201, and response signals B1, B2, and B3 corresponding to the request signals A1, A2, and A3 are transmitted from the interchangeable lens 100 to the camera body 200 as illustrated in (c) in FIG. 5.

In the live view mode of this embodiment, the frame rate is changeable so as to have the exposure adapt for the luminance conditions of the subject. Therefore, in the case of a dark scene, the frame rate decreases (a period of one frame increases). In the normal communication mode, even when the period of one frame increases, the lens information can be acquired at a constant period T and reflected in lens driving. Accordingly, there is an advantage in that an appropriate display of the live view can be performed without display delay.

On the other hand, in a video recording mode, the frame rate is usually fixed to, for example, 24 fps, 30 fps, or 60 fps. This frame rate can be set by the user. In a case in which, for example, correction according to lens optical characteristics (for example, a point image restoration process) is applied to each frame of the video, it is necessary to accurately notify the camera body 200 of a lens state in each frame.

However, in the communication between the camera body 200 and the interchangeable lens 100, a communication format in which a replay to the request from the camera body 200 is performed is adopted since there are various interactions such as a lens driving request, in addition to the notification of the lens information or the like. However, it may be difficult for the camera body 200 to acquire various lens information while performing lens driving within a limited time such as a frame unit.

Accordingly, in the present invention, switching is performed from the normal communication mode to the synchronous communication mode in a case in which the video recording mode is instructed.

The synchronous communication mode is a new communication mode adopted in the video recording mode. In the synchronous communication mode, response signals C1, C2, C3, C4, . . . indicating the lens information of the interchangeable lens 100 are automatically transmitted from the interchangeable lens 100 to the camera body 200 in synchronization with the synchronization signal VSYNC ((a) in FIG. 5), as illustrated in (c) in FIG. 5. Since the response signals C1, C2, C3, and C4 are transmitted without reception of the request signal from the camera body 200, it is possible to shorten at least the communication time necessary for transmission and reception of the request signal.

In the synchronous communication mode of this example, the interchangeable lens 100 transmits the response signals C1, C2, C3, C4, . . . indicating the lens information immediately after receiving the synchronization signal VSYNC, but originally, there is free time in a communication line of from the interchangeable lens 100 to the camera body 200 immediately after the synchronization signal VSYNC is received. It is possible to effectively use the free time by transmitting the response signals indicating the lens information in the free time.

Further, in the synchronous communication mode, communication other than the acquisition of the lens information is also performed, but this communication is also performed in synchronization with the synchronization signal VSYNC. That is, the camera body 200 transmits, for example, request signals A5, A6, A7, A8, . . . requesting lens driving in synchronization with the synchronization signal VSYNC, and the interchangeable lens 100 transmits response signals B5, B6, B7, B8 . . . corresponding to the request signals A5, A6, A7, A8, . . . to the camera body 200. Accordingly, the communication in the synchronous communication mode and the communication in the normal communication mode are present together in one frame.

Further, in the example illustrated in FIG. 5, the lens information is transmitted in each frame, but a transmission frequency of the lens information may be changed. For example, the interchangeable lens 100 transmits information regarding to the lens information in each frame in the case of 30 fps or 60 fps, but in a case in which a high frame rate such as 120 fps or 240 fps for high image quality of the video is set, the transmission frequency may decrease, such as once in every two frames and once in every three frames. Accordingly, communication according to the performance of the interchangeable lens 100 can be performed, and communication of sufficient information can be performed for the lens driving. Further, the communication of the information on the lens driving is not limited to the case in which the request signal is sent in each frame, and the transmission frequency may be changed according to the frame rate as described above.

Further, in the communication of the information on the lens driving, the communication method in which the response signals B5, B6, B7, and B8 are transmitted in response to the request signals A5, A6, A7, and A8 as described above is maintained. Accordingly, the interchangeable lens 100 can acquire the information on lens driving at a valid timing for driving the lens in order to keep appropriately driving the lens.

Further, in a case in which switching is performed from the live view mode to the video recording mode, the camera body 200 transmits a request signal A4 for notification of switching to the video recording mode to the interchangeable lens 100, and the interchangeable lens 100 transmits a response signal B4 indicating notification confirmation in response to the request signal A4 to the camera body 200 while switches the communication mode of the interchangeable lens 100 side to the synchronous communication mode.

Thus, the interchangeable lens 100 is switched to the synchronous communication mode in response to the notification of the video recording mode, prepares for notification to the camera body 200 by acquiring various lens information, and transmits a response signal indicating the various prepared lens information to the camera body 200 according to the synchronization signal VSYNC synchronized with the frame. The camera body 200 can reliably acquire the lens information in a short frame time since a form in which various lens information is immediately received by omitting a step of requesting acquisition of various lens information and performing the response can be adopted.

Further, since communication requesting another lens driving or the like can be performed by transmitting the response signal in response to the request signal, it is possible to request lens driving at a valid timing for driving lens, so that the lens is kept driven at a valid timing for driving lens even when the frame rate is changed, for example, due to a setting of the user.

In the case illustrated in FIG. 5, the switching is performed between the normal communication mode and the synchronous communication mode according to the switching between the live view mode and the video recording mode, but the present invention is not limited thereto.

For example, the switching between the normal communication mode and the synchronous communication mode may occur based on the fact that the necessary lens information cannot be acquired in the period of one frame in the normal communication mode. That is, in a case in which the camera body cannot acquire the lens information in a period of one frame due to lots of lens information in the normal communication mode, switching may occur so that the lens information is acquired using the synchronous communication mode. Accordingly, it possible to appropriately acquire the lens information even in a case in which lots of lens information is necessary or in a case in which one frame period is short.

Further, the communication between the camera body 200 and the interchangeable lens 100 may be switched according to a case in which the number of pieces of lens information per unit time necessary for image processing of the frame of the video is smaller than a threshold value (first image processing mode), and a case in which the number of pieces of lens information per unit time necessary for image processing of the frame is equal to or larger than the threshold value (second image processing mode). That is, in the communication between the camera body 200 and the interchangeable lens 100, the normal communication mode may be used in the case of the first image processing mode, and the synchronous communication mode may be used in the case of the second image processing mode. Accordingly, it is possible to perform the communication between the interchangeable lens 100 and the camera body 200 suitable for an amount of lens information necessary for the image processing mode. The threshold value stated here is a numerical value determined according to communication capability of the interchangeable lens 100 and the camera body 200, and is not particularly limited. For example, as the threshold value, the number of pieces of lens information can be 5, and more preferably, can be 3.

Further, for example, the communication between the camera body 200 and the interchangeable lens 100 may be switched according to the video recording mode in which the point image restoration process is not performed (first image processing mode) and the video recording mode in which the point image restoration process is performed (second image processing mode). That is, in the case of the video recording mode in which the point image restoration process is not performed, the communication may be performed in the normal communication mode, and in the case of the video recording mode in which the point image restoration process is performed, the communication may be performed in the synchronous communication mode. While it is necessary for lots of lens information to be acquired from the interchangeable lens in the point image restoration process as described below, it is possible to appropriately perform the communication of sufficient lens information in the video recording mode in which the point image restoration process is not performed and the video recording mode in which the point image restoration process is performed in this example. The switching of the image processing mode is performed by an image processing mode switching unit (not shown). The image processing mode switching unit is installed in the body-side CPU 220.

Further, switching between the normal communication mode and the synchronous communication mode is performed by the communication mode switching unit. Specifically, the communication mode switching unit is included in the body-side CPU 220 to switch between the normal communication mode and the synchronous communication mode.

Further, since the video to be recorded has high image quality in the video recording mode, it is preferable to apply the communication scheme according to this example to acquire the lens information from the interchangeable lens 100, and perform image processing based on the lens information, but the application of the communication scheme according to this example is not limited to the video recording mode. For example, the frame rate may also be fixed in the live view mode, and in the live view mode, the camera body 200 may apply the communication scheme of this example to acquire the lens information from the interchangeable lens, and perform image processing based on the lens information.

Figure 6:
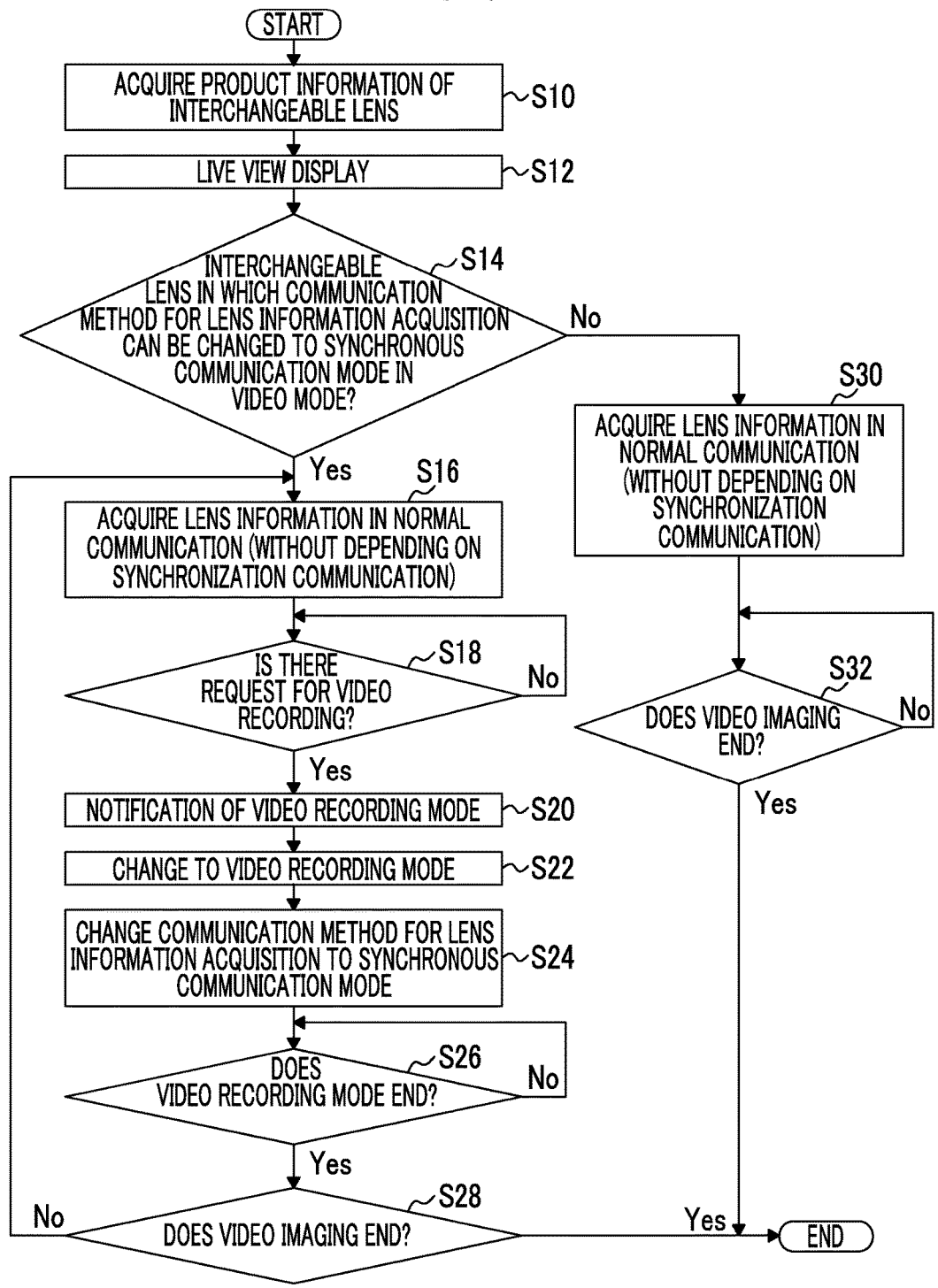
FIG. 6 is a flow diagram regarding a camera system.

FIG. 6 is a flow diagram regarding a camera system (imaging device 10) of the camera body 200 and the interchangeable lens 100 which perform the communication illustrated in FIG. 5.

First, in the case that the interchangeable lens 100 is mounted on the camera body 200, the body-side CPU 220 acquires product information of the mounted interchangeable lens 100 via the body-side communication unit 250 (step S10). Then, the display control unit 214 starts a live view display (step S12). The body-side CPU 220 determines whether the interchangeable lens 100 is a synchronous communication mode compliant product in the video recording mode based on the acquired product information of the interchangeable lens 100 (step S14). In a case in which the body-side CPU 220 determines that the interchangeable lens 100 is the synchronous communication mode compliant product (Yes in step S14), the body-side CPU 220 acquires the lens information through communication in the normal communication mode while the live view display is being performed (step S16). Thereafter, the body-side CPU 220 determines whether or not there is a request to change the camera body 200 to the video recording mode from the operation unit 222 (step S18). In a case in which the body-side CPU 220 determines that there is no request to change the camera body 200 to the video recording mode from the operation unit 222 (No in step S18), the body-side CPU 220 then acquires the lens information through the communication in the normal communication mode.

On the other hand, in a case in which the body-side CPU 220 detects the request to change the camera body 200 to the video recording mode from the operation unit 222 (Yes in step S18), the body-side CPU 220 notifies the interchangeable lens 100 of the change to the video recording mode (step S20). Then, the body-side CPU 220 changes the camera body 200 to the video recording mode (step S22). Thereafter, the communication mode switching unit of the body-side CPU 220 switches the communication between the interchangeable lens 100 and the camera body 200 to the synchronous communication mode (step S24).

Thereafter, the body-side CPU 220 determines whether or not there is a request to end the video recording mode from the operation unit 222 (step S26). In a case in which the body-side CPU 220 does not detect the request to end the video recording mode (No in step S26), the body-side CPU 220 then performs the communication between the interchangeable lens 100 and the camera body 200 in the synchronous communication mode.

On the other hand, in a case in which the body-side CPU 220 detects the request to end the video recording mode (Yes in step S26), the body-side CPU 220 determines whether or not there is a request to end video imaging from the operation unit 222 (step S28). In a case in which the body-side CPU 220 does not detect a request to end video imaging (No in step S28), the communication mode switching unit installed in the body-side CPU 220 transitions to step S16, and switches the communication between the interchangeable lens 100 and the camera body 200 to the normal communication mode. On the other hand, in a case in which the body-side CPU 220 detects the request to end video imaging (Yes in step S28), the video imaging ends.

On the other hand, in a case in which the body-side CPU 220 determines that the interchangeable lens 100 is not the synchronous communication mode compliant product (No in step S14), the body-side CPU 220 sets the communication between the interchangeable lens 100 and the camera body 200 to the normal communication mode (step S30), and maintains the normal communication mode even when a change to the video recording mode occurs. Thereafter, the body-side CPU 220 determines whether or not there is a request to end video imaging from the operation unit 222 (step S32). In a case in which the body-side CPU 220 does not detect the request to end the video imaging (No in step S32), the communication between the interchangeable lens 100 and the camera body 200 is then performed in the normal communication mode. On the other hand, in a case in which the body-side CPU 220 detects the request to end the video imaging, the video imaging ends.

Modification Examples of Transmission Form

Next, modification examples of a transmission form of the synchronous communication mode will be described.

Modification Example 1

In modification example 1, the interchangeable lens 100 collects lens information including a plurality of types of lens information into one piece of information and transmits the information to the camera body 200. Accordingly, in this example, even when the lens information includes a plurality of types of lens information, it is possible to reliably transmit the plurality of lens information in a short period of time.

Figure 7:
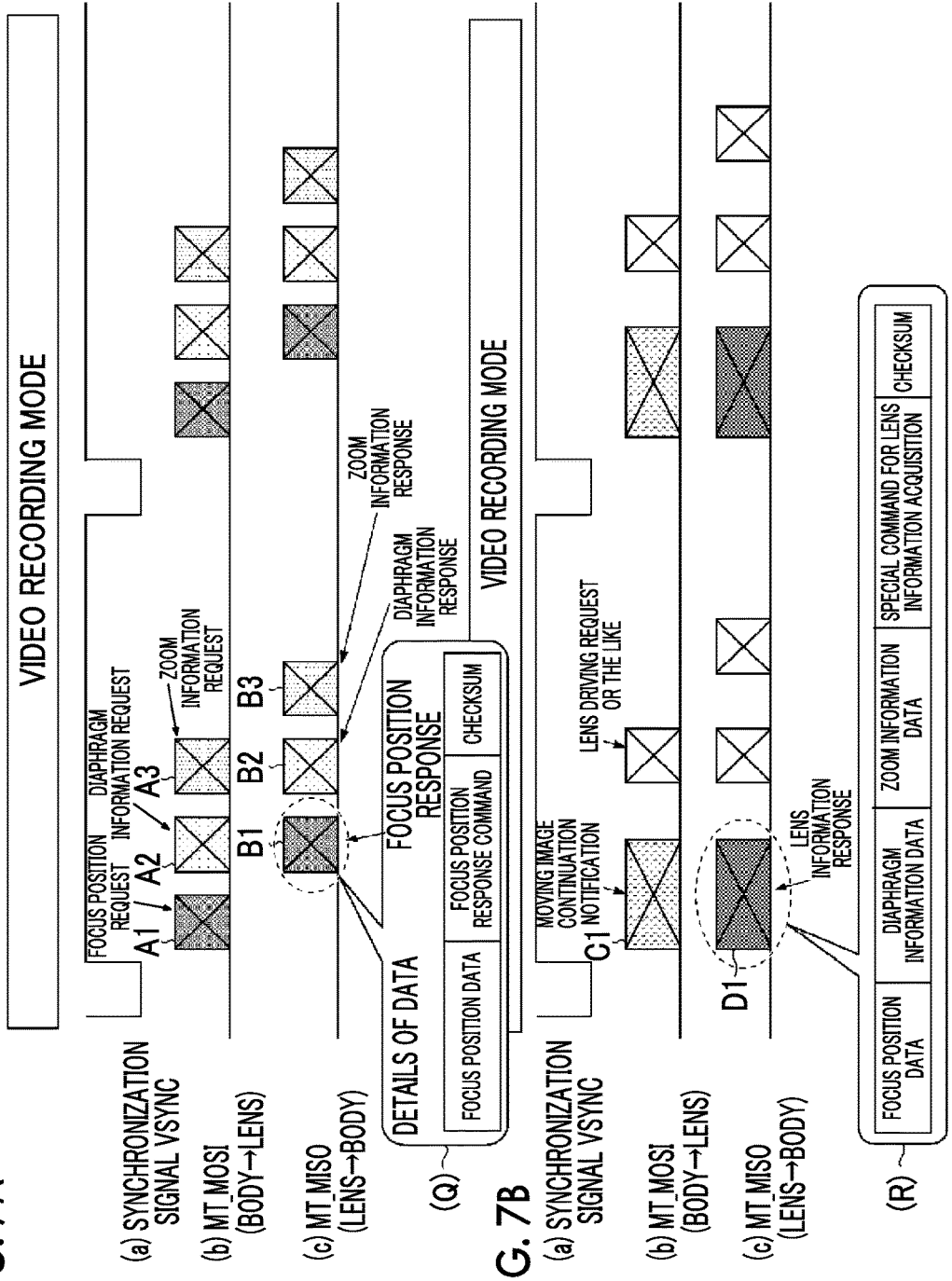
FIGS. 7A and 7B are timing charts illustrating communication of modification example 1.

FIGS. 7A and 7B are timing charts illustrating a synchronization signal of a frame, and communication content of serial communication between the camera body 200 and the interchangeable lens 100 in modification example 1.

FIG. 7A illustrates a form in which the camera body 200 transmits a request signal in synchronization with the synchronization signal, and the interchangeable lens 100 transmits the lens information in response to the request signal. Specifically, the camera body 200 separately transmits a request signal A1 for a focus position, a request signal A2 for diaphragm information, and a request signal A3 for zoom information within a period of one frame, and the interchangeable lens 100 responds with a focus position B1, diaphragm information B2, and zoom information B3 in response to the request signals. In this case, for example, in a case in which the response with the focus position B1 is performed, a structure of data includes focus position data, a focus position response command, and checksum, as indicated by (Q) in FIG. 7A.

In the case of FIG. 7A, since the interchangeable lens 100 transmits the lens information to the camera body 200 in response to the request signal (communication in the normal communication mode), more time is required for transmission of the lens information than a case in which the interchangeable lens 100 transmits the lens information without reception of the request signal (synchronous communication mode). Further, since the plurality of types of lens information is individually transmitted in the transmission form illustrated in FIG. 7A, more time is required for transmission of the lens information.

On the other hand, in communication in the synchronous communication mode according to this example, since first communication content after synchronization is fixed by switching to the video recording mode, the communication between the camera body 200 and the interchangeable lens 100 changes a communication word length and a communication format while switching to the video recording mode. More specifically, as illustrated in FIG. 7B, the camera body 200 initially transmits a video mode continuation notification C1, and the interchangeable lens 100 transmits lens information D1 in which data of the focus position, the diaphragm information, and the zoom information is collected into one piece of data. In this case, the interchangeable lens 100 transmits the lens information without reception of a request signal for the lens information from the camera body 200.

In the form illustrated in FIG. 7A, when the lens information of the focus position, the diaphragm information, and the zoom information is acquired, if each piece of the information is assumed to be transmitted and received in a 32-bit length (data: 16 bits, command: 10 bits, and checksum: 6 bits), data transmission of a total of 96 bits is necessary. On the other hand, in the form illustrated in FIG. 7B, the respective pieces of data are collected into one piece of data to be compressed in a 64-bit length (focus data: 16 bits, diaphragm data: 16 bits, zoom data: 16 bits, command: 10 bits, and checksum: 6 bits) (see (R) in FIG. 7B).

Further, by collecting the plurality of lens information into one piece of information and transmitting the information, a blanking time between respective commands can also be omitted. Accordingly, a time shortening effect above a bit length can be expected. In the example illustrated in FIG. 7B, a word length of communication of first communicated data in which a frame is switched is changed, and a plurality of lens information is collected into one piece of information and transmitted. Accordingly, first, lens control can be performed while reliably acquiring the lens data in each frame by performing, for example, a request to drive the lens, as necessary, after the lens information is acquired. Here, changing the word length of the communication is not limited to first communication in a period of one frame. Further, the diaphragm information is information indicating a diaphragm value (F value) or a diaphragm aperture diameter, the zoom information is information indicating a position, a focal length, or a zoom magnification of the zoom lens, and the focus position is information on the position of the lens in a focusing state.

As described above, according to modification example 1, the lens-side control unit collects a plurality of types of lens information into one piece of information and transmits the information to the camera body 200 in the synchronous communication mode. Accordingly, in modification example 1, it is possible to transmit lots of information in a shorter period of time. Further, by reliably transmitting the plurality of types of lens information in each frame, it is possible to perform an accurate correction process on each frame, and to improve image quality of the video.

Modification Example 2

In modification example 2, the interchangeable lens 100 transmits a plurality of types of lens information with the type of lens information being changed in the synchronous communication mode, and the interpolation unit of the camera body 200 interpolates a type of lens information insufficient for image processing of the video within the frame using the lens information included in another frame. Accordingly, in this example, even in a case in which there are lots of lens information necessary for image processing of the video, it is possible to perform communication so that the image processing can be performed using appropriate lens information for each frame.

Figure 8:
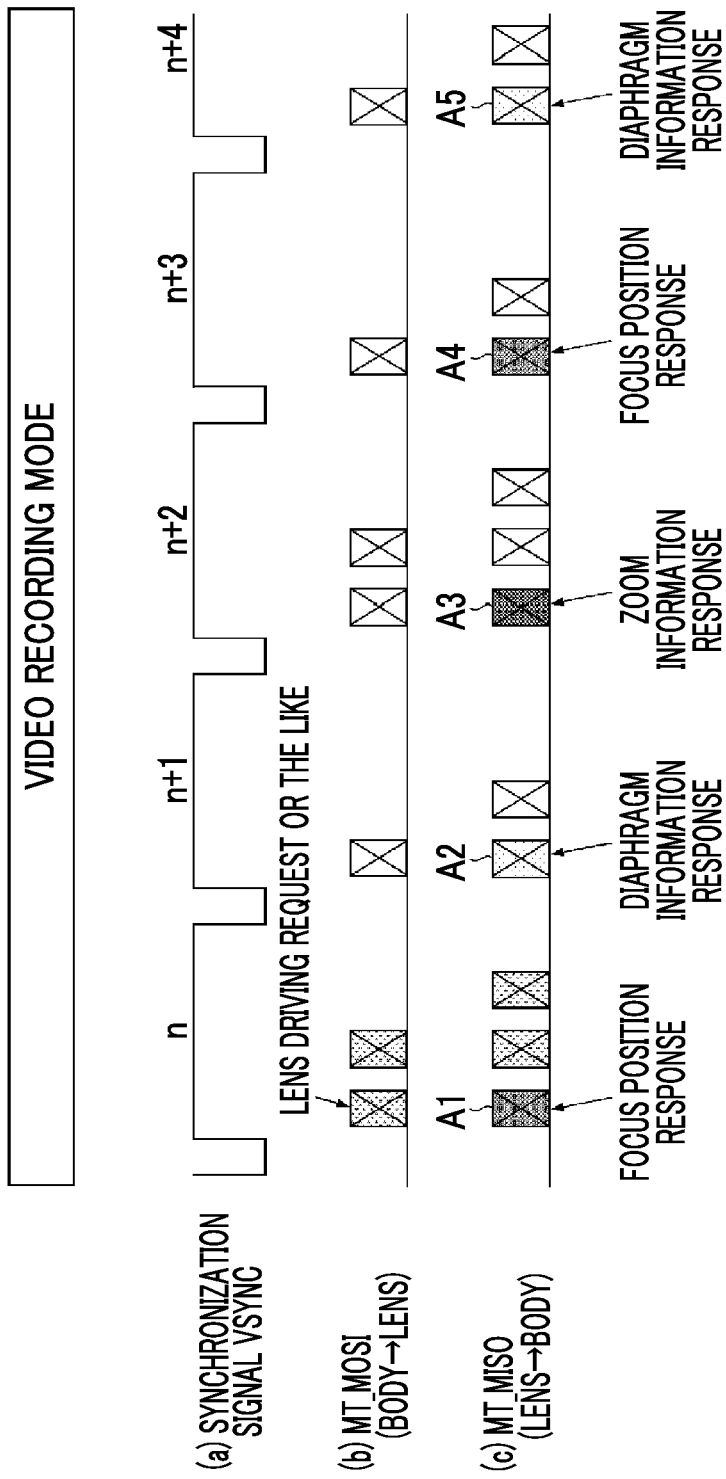
FIG. 8 is a timing chart illustrating communication of modification example 2.

FIG. 8 is a timing chart illustrating a synchronization signal of a frame, and communication content of serial communication between the camera body 200 and the interchangeable lens 100 in modification example 2.

FIG. 8 illustrates a state in which the interchangeable lens 100 changes and transmits a type of lens information without reception of the request signal. Specifically, the interchangeable lens 100 transmits a focus position A1 in a frame n, transmits diaphragm information A2 in a frame n+1, transmits zoom information A3 in a frame n+2, transmits a focus position A4 in a frame n+3, and transmits diaphragm information A5 in a frame n+4. The frame n, the frame n+1, the frame n+2, the frame n+3, and the frame n+4 represent any successive frames in the video recording mode.

Further, the lens information that is not transmitted is interpolated by the interpolation unit. The interpolation unit interpolates a type of lens information insufficient for image processing of the video within the frame using the lens information included in another frame or interpolates lens information regarding a frame of which lens information is not transmitted using the lens information included in another frame.

Since the interchangeable lens 100 transmits only the focus position as lens information in the frame n, the diaphragm information and the zoom information are insufficient in the frame n. Accordingly, the interpolation unit interpolates the diaphragm information and the zoom information in the frame n. For an interpolation method, various methods can be adopted. For example, the interpolation unit can interpolate the diaphragm information and the zoom information in the frame n based on diaphragm information and zoom information included in another frame or diaphragm information and zoom information that have been previously transmitted. An installation place of the interpolation unit is not particularly limited and, for example, the interpolation unit is installed inside the body-side CPU 220.

As described above, according to modification example 2, the interchangeable lens 100 changes the type of lens information for each frame and transmits the resultant lens information. Further, the camera body 200 includes the interpolation unit, and the interpolation unit interpolates a type of lens information insufficient for image processing of the video using the lens information included in another frame. Accordingly, in modification example 2, even in a case in which there are lots of lens information necessary for image processing of the video, it is possible to perform communication so that the image processing can be performed using appropriate lens information for each frame.

Modification Example 3

In modification example 3, the interchangeable lens 100 imparts a priority to each of the plurality of types of lens information, imparts a transmission frequency based on the priority, and transmits the lens information for each frame of the video based on the transmission frequency. Accordingly, in this example, even in a case in which there are lots of lens information necessary for image processing of the video, information important in performing the image processing can be transmitted preferentially.

Figure 9:
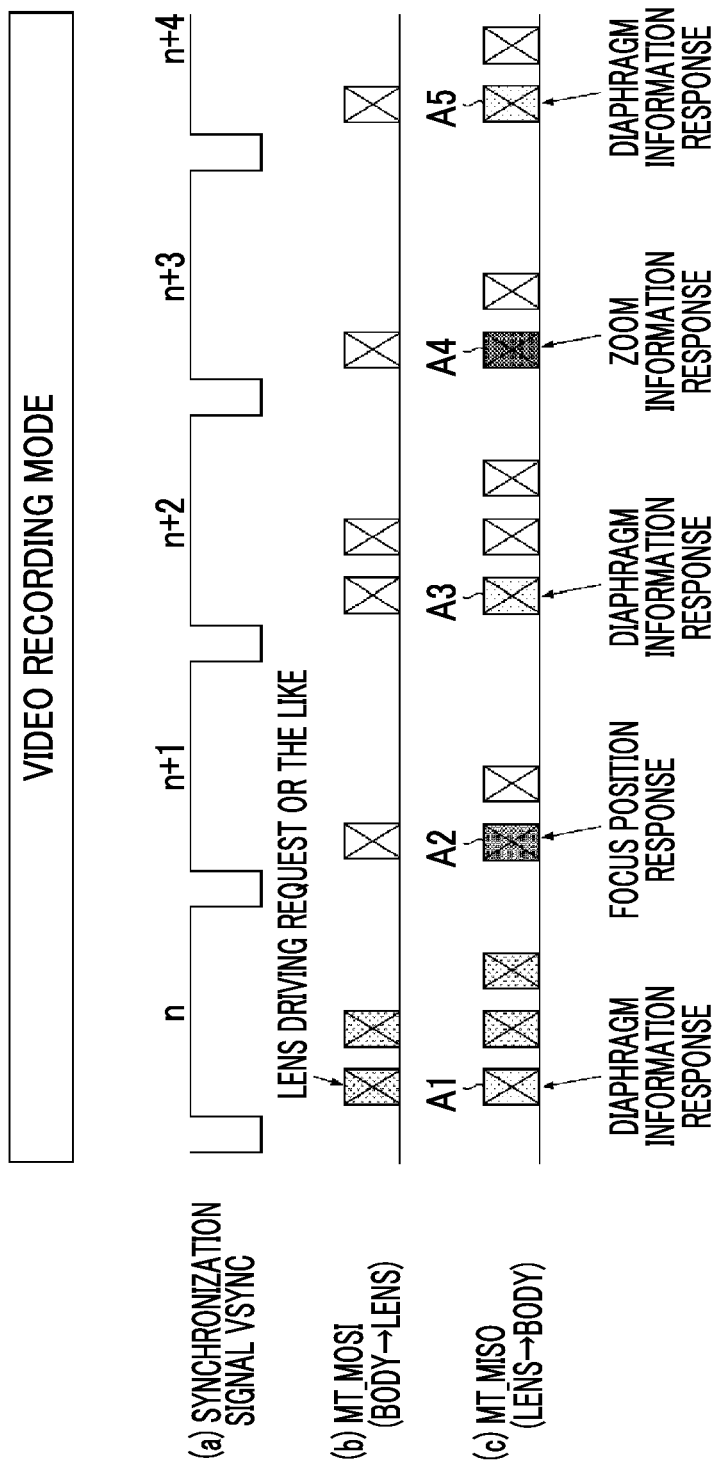
FIG. 9 is a timing chart illustrating communication of modification example 3.

FIG. 9 is a timing chart illustrating a synchronization signal of a frame, and communication content of serial communication between the camera body 200 and the interchangeable lens 100 in modification example 3.

FIG. 9 illustrates a form in which the interchangeable lens 100 transmits the lens information without reception of the request signal, and imparts a priority and a transmission frequency to a plurality of types of lens information and transmits lens information according to the transmission frequency.

In the case illustrated in FIG. 9, the diaphragm information, the focus position, and the zoom information constitute the lens information. The lens-side CPU 120 assigns a priority and a transmission frequency to the lens information. The lens-side CPU 120 sets a first priority for the diaphragm information, and sets a second priority for the focus position and the zoom information. The lens-side CPU 120 assigns the transmission frequency to the respective lens information based on the priorities. Since the priority of the diaphragm information is the first priority, the lens-side CPU 120 sets a high transmission frequency for the diaphragm information. Specifically, the interchangeable lens 100 transmits the diaphragm information A1, A3, and A5 in the frame n, the frame n+2, and the frame n+4. On the other hand, the interchangeable lens 100 transmits a focus position A2 in the frame n+1, and transmits zoom information A4 in the frame n+3. The lens information not transmitted in the period of one frame is processed in the interpolation unit, similar to modification example 2 described above. Thus, the diaphragm information of which the transmission frequency is set to be high is transmitted three times in five frames, and each of the focus position and the zoom information of which the transmission frequency is set to be low is transmitted once in the five frames.

Here, the lens-side CPU 120 can determine the priority and the transmission frequency from various viewpoints. For example, the lens-side CPU 120 may assign the priority and the transmission frequency to the lens information according to an influence on the image processing performed by the camera body 200. Here, the image processing is, for example, a point image restoration process, shading correction, distortion correction, and chromatic aberration correction.

As described above, according to modification example 3, the interchangeable lens 100 assigns the priority and the transmission frequency according to the priority to each of the plurality of types of lens information, and transmits the lens information based on the transmission frequency. Accordingly, it is possible to acquire necessary lens information preferentially and at a high frequency. In particular, in a case in which the camera body 200 performs image processing according to the lens information, the camera body 200 can preferentially transmit information important to performing the image processing according to this example even in a case in which there are lots of lens information necessary for image processing of a video.

Application Examples of Lens Information

Next, examples in which the lens information is acquired and applied according to the communication aspect as described above will be described.

Application Example 1

In application example 1, the imaging device 10 uses the acquired lens information for an image correction process.

FIG. 10 is a main block diagram of the imaging device 10 described with reference to FIG. 3. The imaging device 10 illustrated in FIG. 10 uses the lens information for an image correction process. In FIG. 10, only the blocks necessary for description among the blocks illustrated in FIG. 3 are illustrated. Description of the units described with reference to FIG. 3 will be omitted.

A subject image is captured by the imaging element 201 via the interchangeable lens 100. Thereafter, an AFE 262 including the analog signal processing unit 203, the A/D converter 204, and the image input controller 205 converts an analog signal acquired from the imaging element 201 into video data of a digital signal. An image correction processing unit (image correction unit) 266 in the digital signal processing unit 206 acquires the video data from the AFE 262 and performs an image correction process. Specifically, the image correction processing unit 266 performs shading correction, distortion correction, and chromatic aberration correction, and the like on the video data of each frame based on the lens information acquired for each frame from the interchangeable lens 100.

The image correction process in the image correction processing unit 266 is not limited thereto, and may be an image correction process performed on the acquired image based on the lens information, or may be a process of adjusting or changing a part or all of the image correction process based on, for example, the diaphragm information, the zoom information, or the focus position. For example, in a case in which the image correction process is a filtering process, intensity or a gain of a filter or a type of filter may be changed based on the lens information. Further, a parameter of the image correction process may be changed based on the lens information and, for example, white balance processing to increase accuracy of the processing using brightness information of the subject at the time of imaging obtained from the diaphragm information may be performed. Further, the lens information is preferably a combination of the diaphragm information and the focus position or the diaphragm information and the zoom information of which the frequency of use in the image correction process is high, but is not limited thereto. Further, the lens information may include position information of a correction lens in an optical camera shake correction mechanism. Since optical characteristics such as distortion is changed according to a position of the correction lens in the optical camera shake correction mechanism, an image correction process according to the position information of the correction lens is performed so that a high-precision image correction process is performed.

The body-side CPU 220 acquires the lens information that changes in a time axis (in each frame) from the interchangeable lens 100 via the body-side communication unit 250. A correction process control unit 264 in the body-side CPU 220 calculates a control parameter of the image correction process based on the lens information and transmits the control parameter to the digital signal processing unit 206. The lens information is, for example, the diaphragm information, the zoom information, or the focus position.

Figure 11:
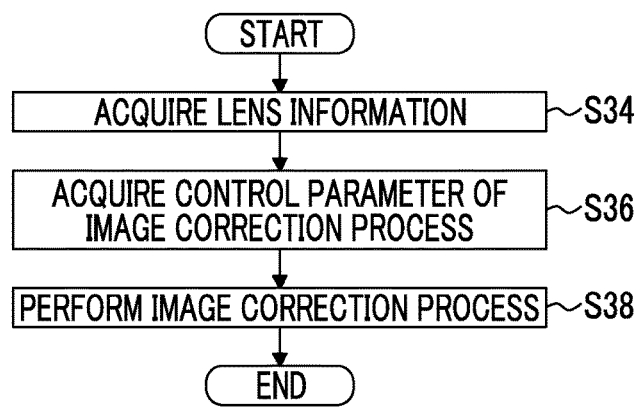
FIG. 11 is an operational flow diagram of the imaging device in application example 1.

FIG. 11 is a flow diagram illustrating an operation of the imaging device 10 illustrated in the block diagram of FIG. 10. First, the body-side communication unit 250 acquires the lens information from the interchangeable lens 100 (step S34). Then, the correction process control unit 264 in the body-side CPU 220 acquires the control parameter of the image correction process (step S36). The image correction processing unit 266 installed in the digital signal processing unit 206 performs the image correction process on the video data based on the control parameter (step S38).

As in application example 1 described above, in a case in which the lens information is used for the image correction process for the video data, the interchangeable lens 100 transmits the lens information in synchronization with a frame and without reception of a request signal. Accordingly, the camera body 200 can appropriately perform the image correction process on the frame.

Application Example 2

In application example 2, the imaging device 10 performs the point image restoration process on the video data using the acquired lens information.

Figure 12:
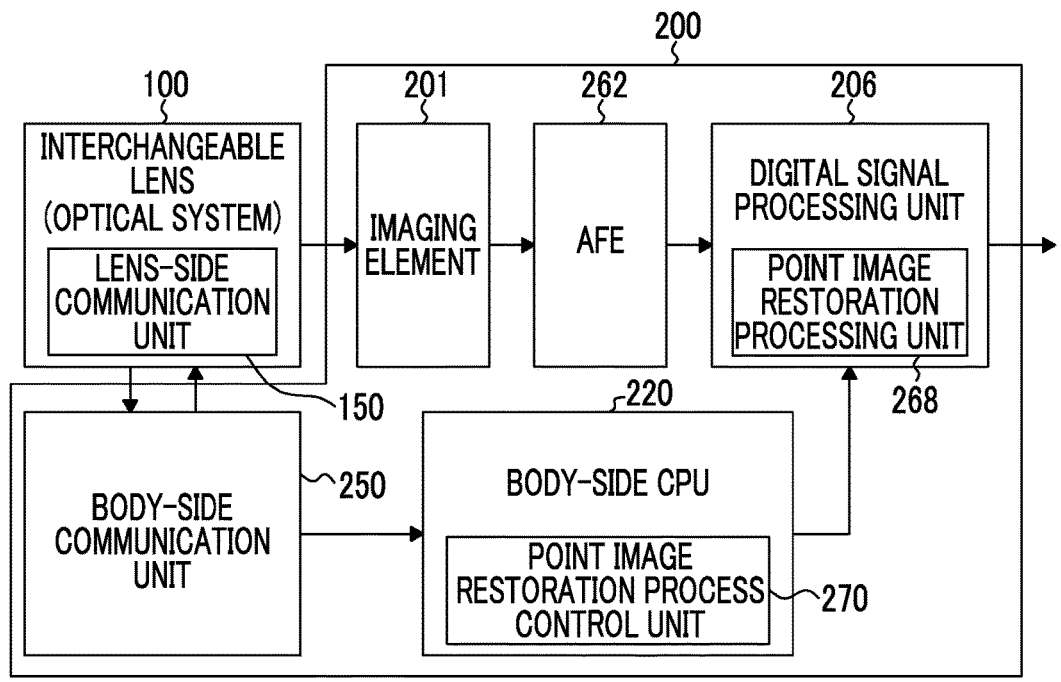
FIG. 12 is a main block diagram of an imaging device in application example 2.

FIG. 12 is a main block diagram of the imaging device 10 described with reference to FIG. 3. The imaging device 10 illustrated in FIG. 12 uses the acquired lens information for the point image restoration process. In FIG. 10, only the blocks necessary for description among the blocks illustrated in FIG. 3 are illustrated. Further, description of the units that have already been described will be omitted.

A point image restoration processing unit 268 in the digital signal processing unit 206 performs a point image restoration process on the video data using a control parameter of the point image restoration process transmitted from the body-side CPU 220.

The point image restoration process and a restoration filter used for the point image restoration process will be described herein. If a blurred image acquired by imaging of the point image is G(X, Y), an original point image is F(X, Y), and a point spread function (PSF) is H(X, Y), a relationship can be represented the following equation.

$$G(X,Y)=H(X,Y)*F(X,Y) \qquad [\text{Equation 1}]$$

Here, * denotes convolution.

H(X, Y) (that is, point spread function) in [Equation 1] is obtained based on the blurred image G(X, Y) acquired by the imaging of the point image.

Next, an inverse function of the above obtained point spread function (PSF) is obtained. If this inverse function is denoted as R(X, Y), a convolution process is performed on the phase-modulated image G(X, Y) by R(X, Y), a restored image corresponding to the original image F(X, Y) is obtained (point image restoration process), as in the following equation.

$$G(X,Y)*R(X,Y)=F(X,Y) \qquad [\text{Equation 2}]$$

R(X, Y) indicates a restoration filter. For the restoration filter, a least-square filter (Wiener filter) that minimizes a mean-square error between an original image and the restored image, a restricted deconvolution filter, a recursive filter, a homomorphic filter, or the like may be used.

In this example, a control parameter used in a variety of point image restoration processes is acquired using the lens information acquired from the interchangeable lens 100. Accordingly, in this example, the point image restoration process suitable for the lens information can be executed for the video data of each frame. The lens information is the diaphragm information, the zoom information, the focus position, or the like. Since the PSF of the imaging optical system 102 including the lens is different according to a diaphragm value, a zoom position, a focus position, or the like, it is preferable to acquire the lens information from the interchangeable lens for each frame on which the point image restoration process is performed and to acquire an appropriate control parameter.

One form of acquiring the control parameter of the point image restoration process suitable for the acquired lens information includes a form of selecting a restoration filter based on the lens information. Specifically, the ROM 228 of the camera body 200 stores a plurality of restoration filters corresponding to the lens information in advance, and the point image restoration process control unit 270 in the body-side CPU 220 selects the restoration filter stored in the ROM 228 based on the acquired lens information. Using the selected restoration filter, the point image restoration processing unit 268 performs the point image restoration process on the video data of each frame.

Further, the interchangeable lens 100 may store a plurality of restoration filters in the ROM 124 on the lens side in advance. That is, the camera body 200 may receive the plurality of restoration filters that have been stored in the interchangeable lens 100 in advance, and store the plurality of restoration filters in the flash ROM 226, and the point image restoration process control unit 270 may select the restoration filter based on the lens information acquired from the plurality of stored restoration filters.

Another form in which the control parameter of the point image restoration process suitable for the acquired lens information is acquired includes a form in which the PSF is selected based on the lens information and the restoration filter is calculated. Specifically, the ROM 124 of the interchangeable lens 100 stores a plurality of PSFs in advance, and the camera body 200 receives the plurality of PSFs and stores the plurality of PSFs in the flash ROM 226. The point image restoration process control unit 270 selects the PSF suitable for the lens information and calculates the restoration filter. Then, using the calculated restoration filter, the point image restoration processing unit 268 performs the point image restoration process on the video data of each frame.

Figure 13:
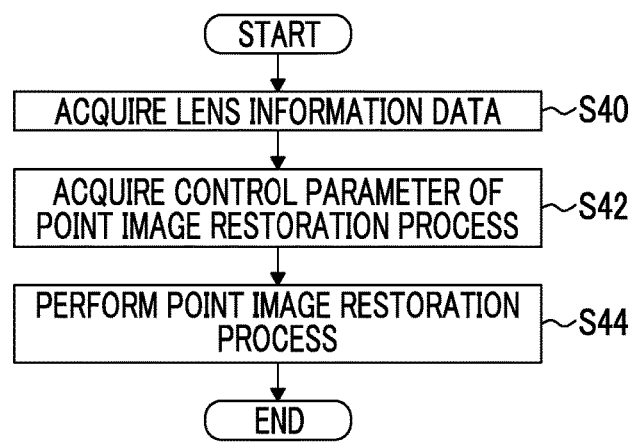
FIG. 13 is an operational flow diagram of the imaging device in application example 2.

FIG. 13 is a flow diagram illustrating the operation of the imaging device 10 illustrated in the block diagram of FIG. 12. First, the body-side communication unit 250 acquires the lens information from the interchangeable lens 100 (step S40). Then, the point image restoration process control unit 270 in the body-side CPU 220 obtains the control parameter of the point image restoration process (step S42). Then, the point image restoration processing unit 268 installed in the digital signal processing unit 206 performs the point image restoration process on the video data based on the control parameter of the point image restoration process (step S44).

As in application example 2 described above, in a case in which the lens information is used for the point image restoration process for video data, since the lens information is transmitted in synchronization with the frame and without reception of a request signal, the camera body 200 can appropriately acquire information required for the point image restoration process.

Application Example 3

In application example 3, the imaging device 10 transmits a notification indicating that the camera body 200 performs the point image restoration process and a notification indicating that the video recording mode is set, to the interchangeable lens 100, and the interchangeable lens 100 transmits a plurality of types of lens information with the type changed for each frame. That is, in application example 3, the communication between the camera body 200 and the interchangeable lens 100 is performed by the form of modification example 2 described above, and the camera body 200 performs the point image restoration process on the video using the acquired lens information.

Figure 14:
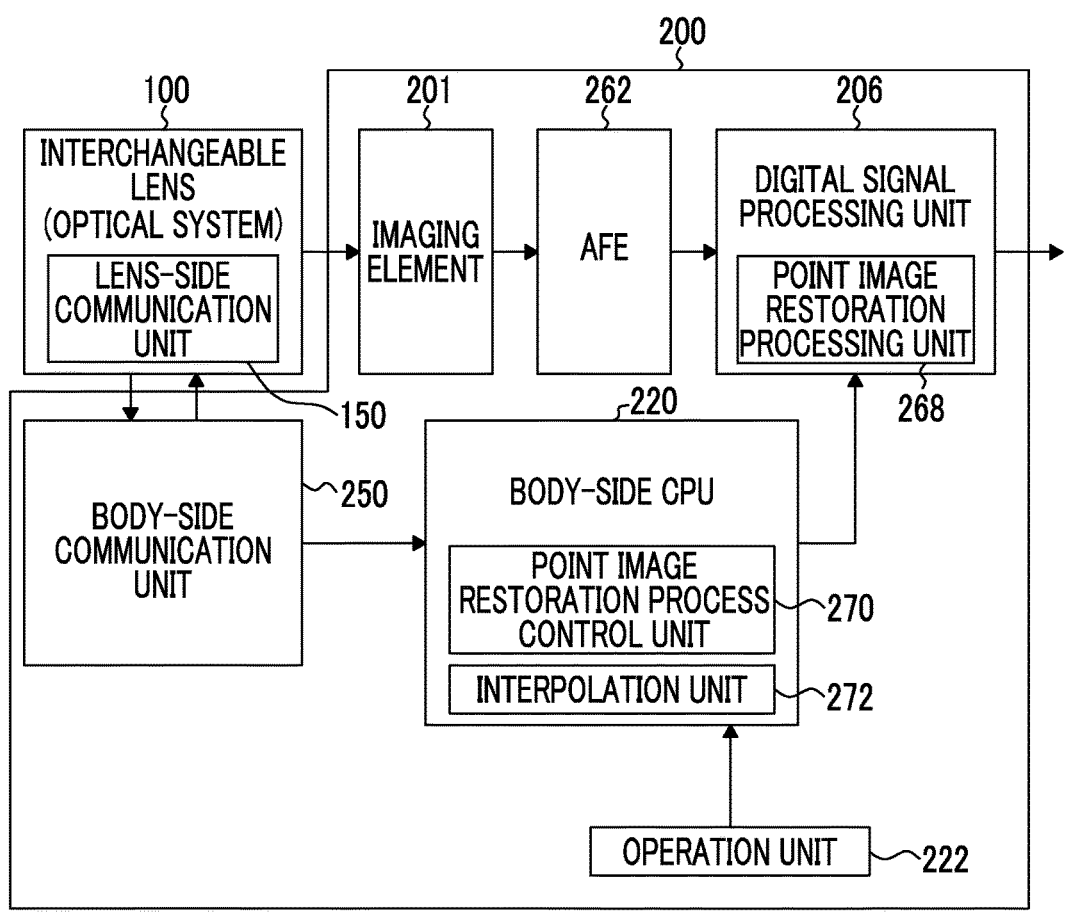
FIG. 14 is a main block diagram of an imaging device in application example 3.

FIG. 14 is a main block diagram of the imaging device 10 described with reference to FIG. 3. The imaging device 10 illustrated in FIG. 14 acquires different lens information for each frame, and performs the point image restoration process on the video based on the acquired lens information. In FIG. 14, only blocks necessary for description among the blocks illustrated in FIG. 3 are illustrated. Description of blocks that have already been described will be omitted.

The operation unit 222 receives an instruction to execute the point image restoration process and an instruction to set the video recording mode from the user. The operation unit 222 notifies the body-side CPU 220 of the instruction to execute the point image restoration process and the instruction to set the video recording mode. Thereafter, the body-side CPU 220 notifies the interchangeable lens 100 that the point image restoration process has been set and that the video recording mode has been set, via the body-side communication unit 250.

The interchangeable lens 100 (lens-side CPU 120) receives the notification indicating that the point image restoration process has been set and the notification indicating that the video recording mode has been set, and transmits the lens information to the camera body 200. In this case, the interchangeable lens 100 changes the diaphragm information, the zoom information, and the focus position in this order for every frame and transmits the diaphragm information, the zoom information, and the focus position one by one.

The interpolation unit 272 in the body-side CPU 220 interpolates, for each frame, a type of lens information insufficient for image processing of the video using the lens information included in another frame. For example, the interpolation unit 272 interpolates the zoom information and the focus position in a frame of which the diaphragm information is transmitted, using the zoom information and the focus position included in the other frame.

The point image restoration process control unit 270 in the body-side CPU 220 acquires the control parameter of the point image restoration process using the lens information of the diaphragm information, the zoom information, and the focus position changed and transmitted for each frame, and the lens information interpolated by the interpolation unit 272. Here, the control parameter of the point image restoration process is, for example, a restoration filter.

Figure 15:
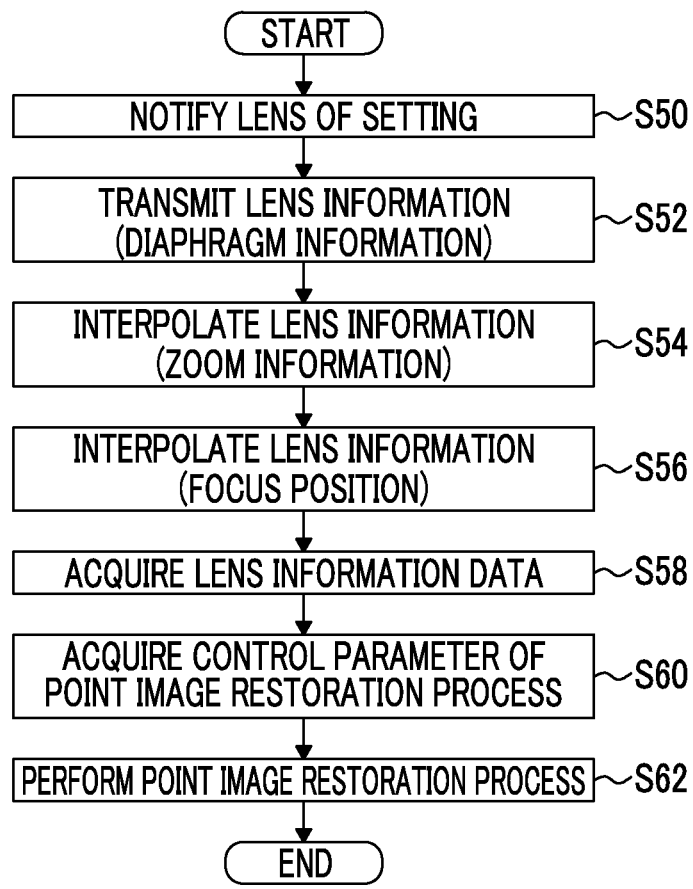
FIG. 15 is an operational flow diagram of the imaging device in application example 3.

FIG. 15 is a flow diagram illustrating an operation of the imaging device 10 illustrated in the block diagram of FIG. 14. First, the camera body 200 notifies the interchangeable lens 100 that the point image restoration process is set and the video recording mode is set (step S50). Then, the interchangeable lens 100 transmits the diaphragm information as the lens information. Then, the interpolation unit 272 interpolates the zoom information using the zoom information included in another frame (step S54), and interpolates the focus position using the focus position included in another frame (step S56). Then, the body-side CPU 220 acquires the lens information of the diaphragm information, the zoom information, and the focus position (step S58). Thereafter, the point image restoration process control unit 270 acquires the control parameter of the point image restoration process based on the acquired lens information and the lens information interpolated by the interpolation unit 272 (step S60). Thereafter, the point image restoration processing unit 268 performs the point image restoration process on the video data based on the control parameter of the point image restoration process.

In application example 3 described above, in a case in which the lens information includes a plurality of types of lens information, different lenses information is transmitted for each frame. Therefore, even when the lens information has a large amount of information, the camera body 200 can appropriately acquire the lens information when the point image restoration process is performed.

Application Example 4

In application example 4, the interchangeable lens 100 (lens-side CPU 120) transmits, at a high frequency, the lens information of which the influence on acquisition of the control parameter of the point image restoration process is great among a plurality of types of lens information. That is, in application example 4, communication between the camera body 200 and the interchangeable lens 100 is performed through the form of modification example 3 described above, and the camera body 200 performs the point image restoration process on the video using the acquired lens information. Accordingly, in this example, it is possible to efficiently perform the transmission of the lens information and eligibly perform the point image restoration process.

In this example, the priority and the transmission frequency of the lens information are determined in consideration of the influence upon the acquisition of the control parameter of the point image restoration process. That is, since the camera body 200 performs the point image restoration process on the video, a high priority is set for the diaphragm information of which the influence on the control parameter (for example, PSF) of the point image restoration process is great, and a high transmission frequency is assigned to the diaphragm information. For example, in every four frames, the interchangeable lens 100 transmits the diaphragm information in two frames, transmits the zoom information in one frame, and transmits the focus position in one frame, and repeats this pattern for transmission (See FIG. 9).

Thereafter, the camera body 200 acquires the control parameter of the point image restoration process using the lens information acquired from the interchangeable lens 100. The lens information not transmitted in one frame is interpolated by the interpolation unit 272 in the body-side CPU 220. Specifically, in the frame in which the interchangeable lens 100 transmits the diaphragm information, the interpolation unit 272 interpolates the zoom information and the focus position using zoom information and a focus position of another frame.

In application example 4 described above, in a case in which the lens information includes a plurality of types of lens information, a type of lens information having an influence on the determination of the control parameter of the point image restoration process is transmitted preferentially and at a high frequently. Accordingly, the camera body 200 can appropriately determine the control parameter of the point image restoration process.

Other Embodiments

The camera system (imaging device 10) of the interchangeable lens 100 and the camera body 200 has been mainly described in the above description, but the present invention is not limited thereto. For example, embodiments of the interchangeable lens, the camera body, and the communication method that realize the present invention may be adopted.

Further, the wired communications has been mainly described in the above description, but the present invention is not limited thereto in a range in which the effects of the present invention are not impaired. For example, the camera system may function through wireless communication.

EXPLANATION OF REFERENCES

10: imaging device
20: optical finder window
22: shutter release button
23: shutter speed dial
24: exposure correction dial
26: eyepiece portion
27: OK key
28: cross key
29: playback button
100: interchangeable lens
102: imaging optical system
104: zoom lens
106: focus lens
108: diaphragm
114: zoom lens control unit
116: focus lens control unit
118: diaphragm control unit
120: lens-side CPU
122: RAM
124: ROM
126: flash ROM
150: lens-side communication unit
160: lens mount
200: camera body
201: imaging element
202: imaging element control unit
203: analog signal processing unit
204: A/D converter
205: image input controller
206: digital signal processing unit
207: RAM
208: compression and decompression processing unit
210: media control unit
212: memory card
214: display control unit
216: monitor
220: body-side CPU
222: operation unit
224: clock unit
226: flash ROM
228: ROM
230: AF detection unit
232: AE/AWB detection unit
240: power control unit
242: battery
244: lens power switch
250: body-side communication unit
252: ASIC
260: body mount
262: AFE

What is claimed is:

1. A camera system including a camera body and an interchangeable lens freely detachable and attachable from the camera body,
wherein the camera body comprises
a body-side communication electric circuit that performs communication with the interchangeable lens; and
a body-side control electric circuit that transmits a request signal to the interchangeable lens via the body-side communication electric circuit, and receives a response signal corresponding to the request signal from the interchangeable lens via the body-side communication electric circuit, the interchangeable lens comprises a lens-side communication electric circuit that performs communication with the camera body; and a lens-side control electric circuit that transmits the response signal corresponding to the request signal to the camera body via the lens-side communication electric circuit when receiving the request signal via the lens-side communication electric circuit, and wherein the body-side control electric circuit transmits the request signal including a lens driving request to the interchangeable lens via the body-side communication electric circuit at least in a video recording mode, and the lens-side control electric circuit, at least in the video recording mode, transmits the response signal corresponding to the request signal to the camera body when receiving the request signal including the lens driving request from the camera body via the lens-side communication electric circuit, and automatically transmits the response signal including a lens information to the camera body in synchronization with a frame of a video based on a synchronization signal without receiving a request signal for the lens information from the camera body, and the transmission of the lens information synchronized with the frame of the video and the transmission and reception of the request signal and the response signal are both performed in a communication period corresponding to the frame of the video.

2. The camera system according to claim 1,
wherein the lens-side control electric circuit changes a transmission frequency and transmits the lens information.

3. The camera system according to claim 1,
wherein the body-side control electric circuit includes a communication mode switching electric circuit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to the frame of the video, and the communication mode switching electric circuit performs switching to the second communication mode in a case in which the lens information cannot be acquired in a period of the frame of the video in the first communication mode.

4. The camera system according to claim 2,
wherein the body-side control electric circuit includes a communication mode switching electric circuit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to the frame of the video, and the communication mode switching electric circuit performs switching to the second communication mode in a case in which the lens information cannot be acquired in a period of the frame of the video in the first communication mode.

5. The camera system according to claim 1,
wherein the body-side control electric circuit includes
a communication mode switching electric circuit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to the frame of the video, and an image processing mode switching electric circuit that switches between a first image processing mode in which a number of pieces of the lens information per unit time necessary for image processing of the frame of the video is smaller than a threshold value and a second image processing mode in which the number of pieces of the lens information per unit time necessary for image processing of the frame of the video is equal to or greater than the threshold value, and the communication mode switching electric circuit performs switching to the second communication mode in the case of the second image processing mode.

6. The camera system according to claim 2,
wherein the body-side control electric circuit includes
a communication mode switching electric circuit that switches between a first communication mode in which only transmission and reception of the request signal and the response signal are performed and a second communication mode in which the transmission of the lens information from the interchangeable lens to the camera body in synchronization with the frame of the video and the transmission and reception of the request signal and the response signal are both performed in a communication period corresponding to the frame of the video, and an image processing mode switching electric circuit that switches between a first image processing mode in which a number of pieces of the lens information per unit time necessary for image processing of the frame of the video is smaller than a threshold value and a second image processing mode in which the number of pieces of the lens information per unit time necessary for image processing of the frame of the video is equal to or greater than the threshold value, and the communication mode switching electric circuit performs switching to the second communication mode in the case of the second image processing mode.

7. The camera system according to claim 5,
wherein the first image processing mode is a live view mode in which live view imaging and displaying are performed, and the second image processing mode is the video recording mode.

8. The camera system according to claim 6,
wherein the first image processing mode is a live view mode in which live view imaging and displaying are performed, and the second image processing mode is the video recording mode.

9. The camera system according to claim 5,
wherein the first image processing mode is the video recording mode in which a point image restoration process is not performed, and the second image processing mode is the video recording mode in which the point image restoration process is performed.

10. The camera system according to claim 1,
wherein the lens-side control electric circuit transmits the lens information in synchronization with the frame of the video based on the synchronization signal of an imaging element installed in the camera body or the interchangeable lens.

11. The camera system according to claim 1,
wherein the lens information of the interchangeable lens includes a plurality of types of lens information, and
the lens-side control electric circuit collects the plurality of types of lens information into one piece of information and transmits the one piece of information to the camera body.

12. The camera system according to claim 1,
wherein the lens information of the interchangeable lens includes a plurality of types of lens information,
the lens-side control electric circuit changes the plurality of types of lens information and transmits the plurality of types of lens information, and
the camera body includes an interpolation electric circuit that interpolates a type of lens information insufficient for image processing of the video within the frame of the video using a lens information of another frame of the video.

13. The camera system according to claim 1,
wherein the lens information of the interchangeable lens includes a plurality of types of lens information,
the lens-side control electric circuit assigns a priority to each of the plurality of types of lens information, assigns a transmission frequency based on the priority, and transmits each of the plurality of types of lens information based on the transmission frequency, and
the camera body includes an interpolation electric circuit that interpolates a type of lens information insufficient for image processing of the video within the frame of the video using a lens information of another frame of the video.

14. The camera system according to claim 1,
wherein the camera body includes an interpolation electric circuit that interpolates the lens information regarding the frame of the video for which the lens information is not transmitted, using a lens information of another frame of the video.

15. The camera system according to claim 13,
wherein the lens information of the interchangeable lens includes lens information of diaphragm information, zoom information, and a focus position,
the body-side control electric circuit transmits the request signal regarding a notification indicating that a point image restoration process is set and a notification indicating that the video recording mode has started to the interchangeable lens, and
the lens-side control electric circuit receives the request signal, and transmits the lens information in each frame of the video in an order of the diaphragm information, the zoom information, and the focus position.

16. The camera system according to claim 1,
wherein the camera body includes an image correction electric circuit that performs image correction on the video data generated inside the camera body, and
the image correction electric circuit performs the image correction on the video data using the lens information.

17. The camera system according to claim 16,
wherein the image correction performed by the image correction electric circuit is a point image restoration process.

18. A camera body that communicates with an interchangeable lens, the camera body comprising:
a body-side communication electric circuit that performs communication with the interchangeable lens; and
a body-side control electric circuit that transmits a request signal to the interchangeable lens via the body-side communication electric circuit, and receives a response signal corresponding to the request signal from the interchangeable lens,
wherein the body-side control electric circuit receives the response signal including a lens information automatically transmitted in synchronization with a frame of a video based on a synchronization signal without the interchangeable lens receiving a request signal for the lens information from the camera body at least in a video recording mode, and, at least in the video recording mode, transmits the request signal including a lens driving request to the interchangeable lens via the body-side communication electric circuit and receives the response signal corresponding to the request signal from the interchangeable lens, and,
the transmission of the lens information synchronized with the frame of the video and the transmission and reception of the request signal and the response signal are both performed in a communication period corresponding to the frame of the video.

19. An interchangeable lens that communicates with a camera body, the interchangeable lens comprising:
a lens-side communication electric circuit that performs communication with the camera body; and
a lens-side control electric circuit that transmits a response signal corresponding to a request signal to the camera body when receiving the request signal from the camera body via the lens-side communication electric circuit,
wherein the lens-side control electric circuit automatically transmits the response signal including a lens information in synchronization with a frame of a video based on a synchronization signal without receiving a request signal for the lens information from the camera body at least in a video recording mode, and, at least in the video recording mode, transmits the response signal corresponding to the request signal including a lens driving request to the camera body when receiving the request signal via the lens-side communication electric circuit, and,
the transmission of the lens information synchronized with the frame of the video and the transmission and reception of the request signal and the response signal are both performed in a communication period corresponding to the frame of the video.

20. A communication method for a camera system in which a camera body transmits a request signal to the interchangeable lens, and the interchangeable lens transmits a response signal corresponding to the request signal to the camera body,
wherein the camera body transmits the request signal including a lens driving request to the interchangeable lens at least in the video recording mode,
the interchangeable lens, at least in a video recording mode, transmits the response signal corresponding to the received request signal including the lens driving request to the camera body when receiving the request signal from the camera body, and automatically transmits the response signal including a lens information in synchronization with a frame of a video based on a synchronization signal without receiving a request signal for the lens information from the camera body, and
the transmission of the lens information synchronized with the frame of the video and the transmission and reception of the request signal and the response signal are both performed in a communication period corresponding to the frame or the video.

* * * * *